US012810643B2

(12) United States Patent
Balasubramaniyan et al.

(10) Patent No.: US 12,810,643 B2
(45) Date of Patent: Nov. 24, 2026

(54) ATTENTION EMBEDDED TRANSFORMER NETWORK DRIVEN DOCUMENT DATA EXTRACTION

(71) Applicant: ADP, Inc., Roseland, NJ (US)

(72) Inventors: Rajarajeswari Balasubramaniyan, Dunwoody, GA (US); Sri Manikanth Nunna, Alpharetta, GA (US)

(73) Assignee: ADP, Inc., Roseland, NJ (US)

( * ) Notice: Subject to any disclaimer, the term of this patent is extended or adjusted under 35 U.S.C. 154(b) by 283 days.

(21) Appl. No.: 18/630,856

(22) Filed: Apr. 9, 2024

(65) Prior Publication Data

US 2025/0316105 A1 Oct. 9, 2025

(51) Int. Cl.

| | |
|---|---|
| ***G06V 30/41*** | (2022.01) |
| ***G06F 40/106*** | (2020.01) |
| ***G06F 40/186*** | (2020.01) |
| ***G06T 7/11*** | (2017.01) |
| ***G06V 30/42*** | (2022.01) |

(52) U.S. Cl.

CPC ............ *G06V 30/41* (2022.01); *G06F 40/106* (2020.01); *G06F 40/186* (2020.01); *G06T 7/11* (2017.01); *G06V 30/42* (2022.01)

(58) Field of Classification Search

CPC ......... G06V 30/41; G06T 7/11; G06F 40/186; G06F 40/106

See application file for complete search history.

(56) References Cited

U.S. PATENT DOCUMENTS

| | | | | |
|---|---|---|---|---|
| 11,580,150 | B1 * | 2/2023 | Gutta | G06F 16/31 |
| 11,822,880 | B2 * | 11/2023 | Begun | G06F 40/186 |
| 12,106,140 | B2 * | 10/2024 | Represas | G06Q 40/08 |
| 2022/0405484 | A1 | 12/2022 | Kanchibhotla et al. | |

OTHER PUBLICATIONS

NPL: InnovationQ+ by IP.com and IEEE: Results Publication Date Range: Nov. 19, 2020 to Mar. 3, 2026.*

NPL, InnovationQ+ by IP.com and IEEE, Results Publication Date Range: Nov. 19, 2020 to Jun. 18, 2026.*

International Search Report and Written Opinion issued in corresponding International Patent Application No. PCT/US2025/023662, dated Jun. 26, 2025 (13 pages).

* cited by examiner

*Primary Examiner* — Quang N Vo

(74) *Attorney, Agent, or Firm* — Foley & Lardner LLP

(57) ABSTRACT

Attention embedded transformer network driven document data extraction is provided. For example, a system integrates one or more processors with a data repository to identify a document of a first type received from a client device. The system determines a portion of the document based on a boundary established by a digital overlay. The system generates, via a trained machine learning model, a query using the portion of the document determined based on the boundary, wherein the query is designed to facilitate an extraction of data relating to the first type. The system inputs the query into a trained attention embedded transformer network model to extract data from the document, the extracted data including at least the extraction of data relating to the first type. The system displays, via the client device, the extracted data.

20 Claims, 9 Drawing Sheets

500

700

ATTENTION EMBEDDED TRANSFORMER NETWORK DRIVEN DOCUMENT DATA EXTRACTION

TECHNICAL FIELD

This application is generally related to computing technology, and particularly to document data extraction using machine learning or attention embedded transformer networks to improve computing performance.

BACKGROUND

Heterogeneous computing systems can store, retrieve, and process different types of data across different systems. Computing systems perform high volumes of document data extraction. Due to documents of the same type having different formats, documents of the same entity having different types, and the large number of requests received by computing systems to perform document data extraction on documents from a plurality of domains, document data extraction can be computing resource intensive, error prone due to the non-uniformities, and cause systematic problems including latency, traffic congestion, or delay.

SUMMARY

This technology is directed to templated document data extraction via trained machine learning models, including, for example, trained attention embedded transformer network models. For example, aspects of the technical solutions described herein can identify and extract information from a plurality of document types. One or more of the plurality of document types correspond to a domain of a plurality of domains. Some aspects of the technical solutions herein facilitate templating documents of a first type into a uniform format.

Aspects of the technical solutions described herein facilitate generating and using a template to extract data from a document received via a client device. For example, aspects of the technical solutions herein identify a document of a first type received from a client device. In some embodiments, aspects of the technical solutions herein determine a domain of a plurality of domains associated with the first type. Aspects of the technical solutions described herein determine a portion of the document based on a boundary. The boundary can be established by a digital overlay. Aspects of the technical solutions described herein generate training data sets to be used in model training by creating one or more new documents from the document. Aspects of the technical solutions described herein utilize trained machine learning models or trained attention embedded transformer network models to extract and template information from document into a new format associated with the first type. Aspects of the technical solutions described herein enable multiple client devices associated with an entity to produce uniform results when extracting information from documents of the first type.

Acquiring the requisite amount of training data to enable systems to accurately extract data from documents associated with a single domain, let alone a plurality of domains, can be computationally intensive. Producing uniform outputs of document data extraction within an entity can also be computationally intensive. Computationally intensive can refer to or include, for example, utilizing excessive or large amounts of processing or memory that exceed certain predetermined thresholds; for example, that amount of processor or memory used to accurately train the model to extract data from documents relating to the plurality of domains. Computationally intensive can refer to or include computational costs used to extract information from the document, or the computational costs used to provide uniform outputs among client devices associated with an entity. Computational costs can include factors such as network bandwidth, time, memory, electric power, and processing power, etc. The computational cost can also be indicated in terms of computations being performed, for example, the number of floating point operations (FLOPS), or as the number of multiply-and-accumulate operations (MACs or MACCs), etc.

These document data extractions can cause latency, error, traffic congestion, or delay across a system including the client devices and data processing systems due to the size of the data, intricacies of the data, and variety of formats of the documents. Furthermore, document data extraction can be prone to error and is not easily extensible to new formats of documents, new types of documents, or different domains associated with types of documents. Due to the large volume of documents with differing formats and types, different domains associated with the types, and the scale of heterogeneous computing systems, it can be challenging to extract information from different documents and template the information into a new, uniform format without excessive latency, inaccuracy, or generating erroneous computing actions. These technical challenges further prevent one or more client devices from receiving extracted and standardized information due to extensive network traffic and reduced throughput, thereby affecting the efficiency of the system overall. In addition to the systematic problems created by document data extraction, it can be technically challenging to perform document data extraction on documents of different formats, different types, associated with different domains, and to generate outputs that have uniform formats from one or more client devices.

Technical solutions are provided herein to address such technical challenges. The technical solutions identify a document of a first type received from a client device. The technical solutions facilitate use of trained machine learning models (e.g., trained attention embedded transformer network models) to classify, extract, and template information from the document. The technical solutions described herein facilitate classification, extraction, and templating of documents of a variety of formats, of a variety of types, of a variety of domains, as well as documents that may be received from a variety of disparate sources. In some embodiments, the technical solutions described herein identify a format of the document. The technical solutions described herein determine a portion of the document based on a boundary established by a digital overlay. In some aspects, the technical solutions described herein identify one or more labels of the portion. The technical solutions described herein facilitate use of trained machine learning models to extract and template information extracted from the portion or the document. In some aspects, the technical solutions herein determine a schema for the document data extraction and template the document data extraction according to the schema. Thus, by utilizing trained machine learning models to classify documents, extract information from documents, and template the information in a standardized manner, the technical solutions described herein reduce the computational cost (e.g., network bandwidth, time, memory, electric power, and processing power) associated with extracting information from a document by a data processing system compared to previous document data extraction systems. Accordingly, the technical solutions described herein are rooted in computing technology, and provide improvements to computing technology, particularly systems that identify documents, determine portions of documents, extract information from portions of documents, and ensure the information is templated in a uniform manner.

At least one aspect of the technical solutions described herein is directed to a system. The system includes one or more processors, coupled with memory. The one or more processors identify a document of a first type. The document of the first type is received from a client device. The one or more processors establish a boundary of a portion of the document based on a digital overlay. The one or more processors select a portion of the document based on the boundary. The one or more processors generate, using a trained machine learning model, a query using the portion of the document, the query is designed to facilitate an extraction of data. The data to be extracted is based on the document being of the first type. The one or more processors extract the data from the document of the first type by inputting the query to a second trained machine learning model.

In some aspects of the technical solutions described herein, the one or more processors determines a validation score for the extracted data. The one or more processors displays the extracted data via the client device in response to the validation score being above a threshold.

In some aspects of the technical solutions described herein, the one or more processors determines the validation score using the trained machine learning model. The trained machine learning model receives the extracted data as an input.

In some aspects of the technical solutions described herein, the one or more processors determines, using the second trained machine learning model, the validation score, wherein the second trained machine learning model receives the extracted data as an input.

In some aspects of the technical solutions described herein, the one or more processors determines, via the trained machine learning model, a first validation score, wherein the trained machine learning model receives the extracted data as a first input. The one or more processors determines, via the second trained machine learning model, a second validation score, wherein the second trained machine learning model receives the extracted data as a second input. The one or more processors displays the extracted data in response to a determination that the first validation score and the second validation score are both above the threshold.

In some aspects of the technical solutions described herein, the one or more processors determines a validation score for the extracted data. The one or more processors extracts new data from the document of the first type by inputting the query into the second trained machine learning model in response to a determination that the validation score is below a threshold. The one or more processors determines a new validation score for the extracted new data. The one or more processors replaces the extracted data with the extracted new data, in response to a determination that the new validation score is above the threshold.

In some aspects of the technical solutions described herein, the one or more processors determines a domain of a plurality of domains of the document according to the first type. The one or more processors templates the extracted data according to an ontological library corresponding to the domain determined.

In some aspects of the technical solutions described herein, the one or more processors creates at least one new document by an action performed on the document. The one or more processors inputs a first training data set to a machine learning model to train the machine learning model, wherein the first training data set includes the at least one new document and the document.

In some aspects of the technical solutions described herein, the action performed on the document by the one or more processors includes a rotation, an inversion, a rescaling, a blurring, a sharpening, a modification of a quantitative aspect, or a modification of a qualitative aspect.

In some aspects of the technical solutions described herein, the one or more processors creates at least one new document, wherein the new document is a rotation of the document. The one or more processors inputs a first training data set to a machine learning model, wherein the second training data set includes the at least one new document and the document.

In some aspects of the technical solutions described herein, the one or more processors determines a domain of a plurality of domains corresponding to the first type of document, the plurality of domains including: payroll, tax, benefits, human resources, time management, or performance management.

In some aspects of the technical solutions described herein, the one or more processors receives, via the client device, an indication of the first type of document.

In some aspects of the technical solutions described herein, the second trained machine learning model is a trained attention embedded transformer network model.

At least one aspect of the technical solution described herein is directed to a method. The method includes identifying, by one or more processors, a document of a first type received from a client device. The method includes establishing, by the one or more processors, a boundary of a portion of the document based on a digital overlay. The method includes selecting, by the one or more processors, the portion of the document based on the boundary. The method includes generating, by the one or more processors, a query by inputting the portion of the document into a trained machine learning model, wherein the query is designed to facilitate an extraction of data, wherein the data to be extracted is based on the document being of the first type. The method includes extracting, by the one or more processors, the data from the document of the first type by inputting the query into a second trained machine learning model.

In some aspects of the technical solutions described herein, the method includes displaying, by the one or more processors, the extracted data.

In some aspects of the technical solutions described herein, the method includes determining, by the one or more processors, the extracted data in response to determining that the validation score is above a threshold.

In some aspects of the technical solutions described herein, the method includes determining, by the one or more processors, a validation score for the extracted data. The method includes extracting, by the one or more processors, new data from the document of the first type by inputting the query into the second machine learning model in response to determining that the validation score is below a threshold. The method includes determining, by the one or more processors, a new validation score for the extracted new data. The method includes replacing, by the one or more processors, the extracted data with the extracted new data in response to determining that the new validation score is above the threshold.

In some aspects of the technical solutions described herein, the method includes creating, by the one or more processors, at least one new document through an action performed on the document. The method includes inputting, by the one or more processors, a first training data set to a machine learning model to train the machine learning model, wherein the first training data set includes the at least one new document and the document.

In some aspects of the technical solutions described herein, the method includes receiving, by the one or more processors, an indication of the first type of document from the client device.

At least one aspect of the technical solutions described herein is directed to a non-transitory computer-readable medium. The non-transitory computer readable medium includes instructions to cause a processor to identify a document of a first type received from a client device. The instructions cause the processor to generate, using a trained machine learning model, a query using the document, wherein the query is designed to facilitate an extraction of data relating to the first type. The instructions cause the processor to extract the data from the document of the first type by inputting the query into a second trained machine learning model.

In some aspects of the technical solutions described herein, the instructions cause the processor to determine a validation score for the extracted data. The instructions cause the processor to display the extracted data in response to a determination that the validation score is above a threshold.

In some aspects of the technical solutions described herein, the instructions cause the processor to determine a portion of the document based on a boundary established by a digital overlay. The instructions cause the processor to generate, via a trained machine learning model, the query using the portion of the document. The instructions cause the processor to display, the extracted data.

BRIEF DESCRIPTION OF THE DRAWINGS

Aspects of the technical solutions are described in the detailed description which follows, in reference to the noted plurality of drawings by way of non-limiting examples of exemplary embodiments of the technical solutions described herein.

DETAILED DESCRIPTION

Figure 1:
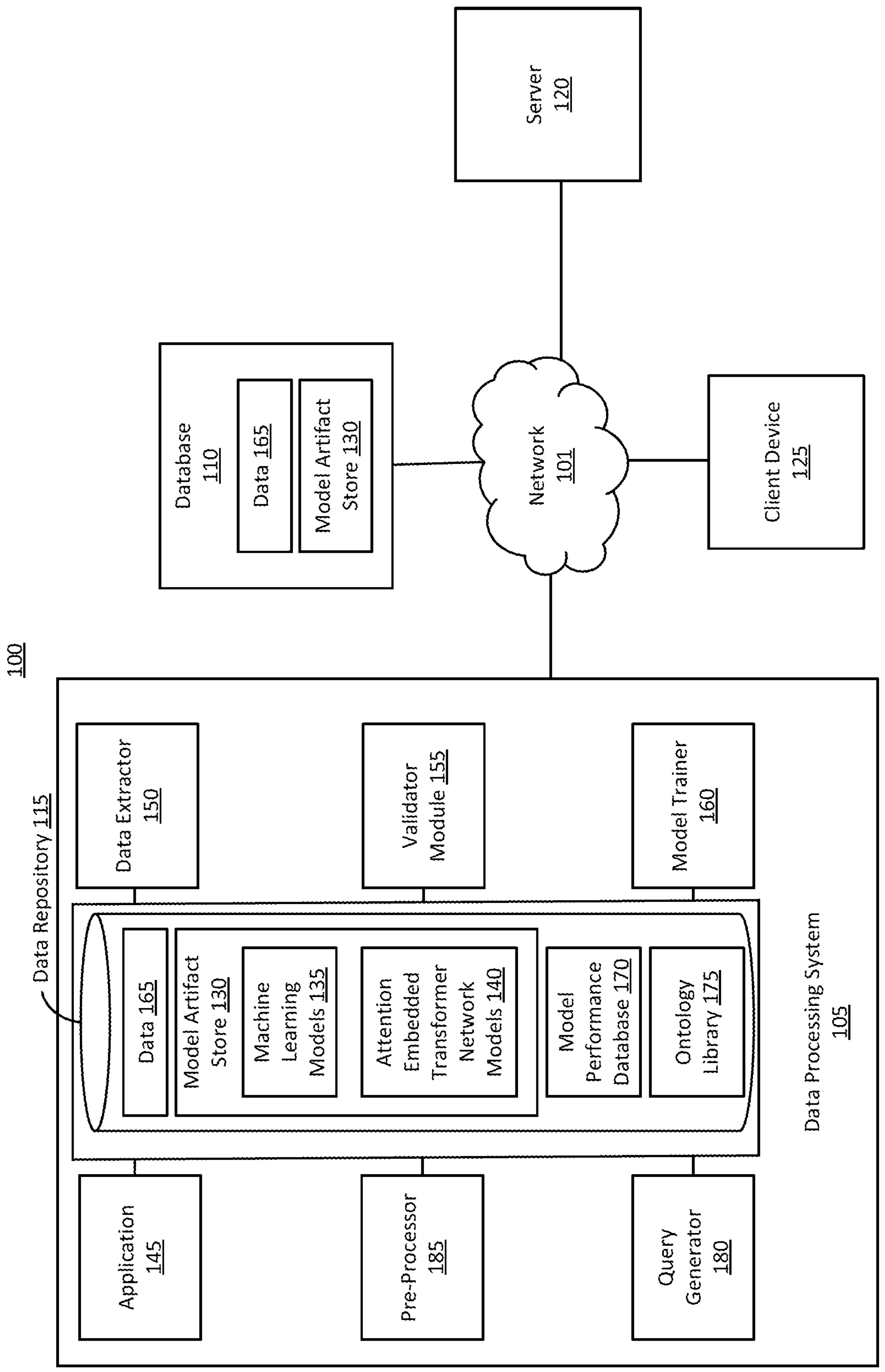
FIG. 1 depicts an example system of templated document data extraction.

Following below are more detailed descriptions of various concepts related to, and implementations of, methods, apparatuses, and systems to template document data extraction. The various concepts introduced above and discussed in greater detail below can be implemented in any of numerous ways.

The technical solutions described herein describe a system, method, and computer readable medium to automatically template document data extraction for a plurality of document types in a plurality of domains using standardized ontologies. Aspects of the technical solutions described herein are generally directed to digitizing documents using templated document data extraction and machine learning. For example, aspects of the technical solutions described herein receive one or more labeled parts of a document and extract information from the content of the labeled parts. Extracting information from documents is an intensive and error-prone process. A technical problem exists such that current document data extraction systems cannot accurately perform document data extraction for more than one domain. Furthermore, existing document data extraction systems require individualized training to competently perform their tasks. This training requires large amounts of data. In addition to the existing limits regarding the domains for which existing systems can provide templated document data extraction, the existing document data extraction systems lack the technical ability to standardize outputs among multiple client devices. Accordingly, existing document data extraction systems experience technical difficulties related to acquisition of training data and the breadth of document types for which the system can provide document data extraction. Further, existing document data extraction systems are only trained to extract the data and lack the technical capabilities of providing a uniform structured output across a variety of client devices. Therefore, where multiple client devices associated with an entity extract data from documents within the same domain, or of the same type, the lack of standardization techniques creates inconsistencies among the outputs generated by the client devices. These inconsistencies can cause crucial information to be lost or can require additional computational costs to correct.

For example, a client device attempts to extract data from documents ranging across a variety of domains. The client device may use several document data extraction systems to extract data from the different domains. Each system used by the client device in this extraction requires intensive training. In addition to lacking the technical capabilities to extract data from multiple domains, current systems lack the technical ability to structure the output in a standardized form. Thus, when two client devices extract document data from different sources (e.g., different structures, such as for example different corporations), where both sources are of the same domain type, discrepancies due to the different sources can cause errors to propagate into the output. For example, these discrepancies can be differences in a format or structure of the documents, or a use of different ontological terms to describe the content to be extracted from the document. Alternatively or in addition, when a client device extracts document data from different sources, where both sources are of the same domain type, discrepancies due to the different sources can cause errors to propagate into the output. For example, an error can be a lack of uniform ontological terms between the outputs, thus preventing uniform outputs of document data extraction. Due to these technical challenges, document data extraction systems are labor intensive, error prone, and lack the ability to structure outputs in a standard using standardized ontological terms associated with a domain of the first type of the document.

The technical solutions described herein identify a document of a first type received from a client device. The technical solutions described herein determine a domain of the document according to the first type. Using a portion of the document based on a boundary established by a digital overlay, the technical solutions herein generate, via a trained machine learning model, a query. The query is designed to facilitate an extraction of data relating to the first type when input by the technical solutions described herein into a second trained machine learning model (e.g. an attention embedded transformer network model). The technical solutions described herein generate an output including at least the extraction of data relating to the first type. The technical solutions described herein template the extracted data (e.g., the output) using an ontological library corresponding to the domain. The technical solutions described herein display the extracted data. By identifying a type of the document, determining a domain of the document corresponding to the first type, generating a query using a portion of the document based on a boundary established via a digital overlay, generating an output from the query, the technical solutions described herein can extract data from documents of a variety of domains and provide standardized outputs when compared to systems which do not use this templated document data extraction.

FIG. 1 depicts an example system 100 that facilitates templated document data extraction according to one or more aspects of the technical solutions described herein. The system 100 includes a data processing system 105, a database 110, at least one client device 125 (sometimes hereinafter referred to as the client device(s) or client service(s)), a server 120, and a network 101. The data processing system 105 can include an application 145, a pre-processor 185, a query generator 180, a data extractor 150, a validator module 155, a model trainer 160, or a data repository 115. The data processing system 105 can include additional components. The application 145, the pre-processor 185, the query generator 180, the data extractor 150, the validator module 155, the model trainer 160, and the data repository 115 each may communicate with the database 110 or the client device 125 via the network 101.

The data processing system 105 can interface with, communicate with, or otherwise receive or provide information with one or more of the client devices 125, the server 120, or the database 110. The data processing system 105 can include at least one logic device such as a server 120. The server 120 can be a computing device having a processor to communicate via a network 101. The data processing system 105 can include or interface with at least one server 120. The server 120 can be a computation resource, server, processor or memory. For example, the data processing system 105 can include a plurality of computation resources or processors. The server 120 can facilitate communications between the data processing system 105, the database 110, or the client device 125 via the network 101.

The network 101 can be a wireless or wired connection for enabling the data processing system 105 to communicate. The data processing system 105 can communicate with internal subcomponents (described herein), or external components (e.g., the server 120, the database 110, or the client device 125, among others) via the network 101. The data processing system 105 can, for example, store data about the system 100 in the data repository 115. The data processing system 105 can, for example, receive the data 165 transmitted from the database 110. The network can include a hardwired connection (e.g., copper wire or fiber optics) or a wireless connection (e.g., wide area network (WAN), controller area network (CAN), local area network (LAN), or personal area network (PAN)). For example, the network 101 can include Wi-Fi, Bluetooth, BLE, or other communication protocols for transferring over networks as described herein.

The data repository 115 includes a model artifact store 130. The model artifact store 130 is a type of memory, database, or other structure for storing data structures (e.g., machine learning models 135 or attention embedded transformer network models 140). In some aspects of the technical solutions described herein, the model artifact store 130 is characterized by a duration of time with which the data structures within the model artifact store 130 are stored. For example, data structures or information within the model artifact store 130 are maintained, stored, or otherwise present within the model artifact store 130 for a period of time. In some aspects of the technical solutions described herein, the model artifact store 130 is characterized by a location of the model artifact store 130. For example, the model artifact store 130 is located within the data processing system 105, or the client device 125. In this manner, the model artifact store 130 is referred to or considered local storage. In some embodiments, accessing the model artifact store 130 (by the data processing system 105, the client device 125, among others) enables the data processing system 105 or the client device 125 to access the information within the model artifact store 130 (such as the machine learning models 135 or the attention embedded transformer network models 140) with less time, latency, or computational power than accessing the information (such as the machine learning models 135 or the attention embedded transformer network models 140) from a remote database, such as the database 110. In some aspects of the technical solutions described herein, the model artifact store 130 is characterized by a type of model stored within the model artifact store 130. For example, the model artifact store 130 stores models of one or more types, including machine learning models 135 (hereinafter generally referred to as machine learning model(s) 135 or trained machine learning model(s) 135) or attention embedded transformer network models 140 (hereinafter generally referred to as attention embedded transformer network model(s) 140 or trained attention embedded transformer network model(s) 140). The model artifact store 130 provides models to the query generator 180 or to the data extractor 150.

The database 110 is or includes a system or computing device including the data 165. The database 110 is or includes a system or computing device including the model artifact store 130. The database 110 is or includes a storage or data repository to store the data 165 or the model artifact store 130. The database 110 is located remotely from the data processing system 105 or the client device 125. For example, the database 110 corresponds to or is maintained by an outside entity such as a government, individual, company, or non-profit organization. In some aspects of the technical solutions described herein, the database 110 is maintained, owned, or operated by the same entity as an entity maintaining, owning, or operating the data processing system 105. In some aspects of the technical solutions described herein, the database 110 is accessed by approved computing system, such as the data processing system 105 operating under the same entity as the database 110. Although a single database 110 is depicted, the database 110 can include multiple databases.

The database 110 maintains, includes, stores, or otherwise hosts the data 165 or the model artifact store 130. The data 165 is any set of aggregated, accumulated, calculated, generated, or otherwise available to an entity. The data 165 includes information about an entity. The entity includes an individual, such as an employee of an organization as described herein, or a grouping of people, such as an employee of an organization as described herein, or a grouping of people, such as an organization, corporation, or educational institution. The information includes data like name, address, social security number, salary, personally identifying information, demographic information, familial information, benefits information, or other such information. The data 165 includes information about an entity such as location of the entity (e.g., an address, physical or coordinate location, a geofence associated with the entity), employees of the entity, tax information, financial information, proprietary information, among other information. For example, the database 110 can be an external computing system maintaining a data repository of payroll, tax, benefits, human resources, time management or performance management for an entity.

The data 165 includes a plurality of values. The values can be alpha-numeric. In some cases, the values are displayable on a screen, such as that of the client device 125, the database 110, or the data processing system 105. For example, the data 165 can include strings such as "First Name", "Earnings", "Withholdings", "Deductions", "Net Pay Allocations", "Reimbursements", "Hours", "Rate", "375.00," or "0.65." The data 165 can include auditory values, such as a sound or vocal recording. The data 165 can include colored or color-coded values. The data 165 can include time-related values, such as current time, elapsed time, clock-in time, among others. The data 165 can include images. The images can contain multiple types of information. For example, an image can be a payroll journal that includes information such as "Employee Name", "Payroll Type", "Earnings", "Withholdings", "Deductions", "Net Pay Allocations", or "Social Security Number." The values of the data 165 includes any combination of values (e.g., the data can be multi-modal). For example, a first value of the data 165 includes an image and a string, and a second value of the data 165 includes an image and an auditory value. The values of the data 165 can relate to each other. In an example, a value of "Earnings" corresponds to a value of "3,129." Some values of the data 165 can be null or zero values.

The database 110 arranges the values of the data 165 in a specified manner, such as a table, a list, or other defined data structure. The database 110 includes different values within the data 165. For example, the database 110 maintains data 165 corresponding to demographics of a computer science company with different values and arrangements of those values for the data 165 than a second data corresponding to tax withholdings for employees of a public education institution.

The data 165 includes different attributes, such as a file type, data type, vendor type, or other such attributes. The data 165 is included in, denoted by, or transmitted as an electronic file type. Examples of electronic file types include comma separated values (CSV), excel files (XLS or XLSM), or data interchange format (DIF), JavaScript Object Notation (JSON), among others. The data 165 can be associated with or stored as a file type. The file type determines or relates to data structures associated with the data 165. In some aspects of the technical solutions described herein, the data 165 is encrypted by the database 110, such as by Advanced Encryption Standard (AES), Rivest-Shamir-Adleman (RSA), or another encryption standard. The data 165 can be unencrypted by the database 110, or by another system enabled for access to the data 165, such as the data processing system 105. In some aspects of the technical solutions described herein, one or more client devices 125 requests access to the data 165 or requests the data 165 itself from the database 110 via the data processing system 105 or through another computing system or the client device 125 directly.

The client device 125 is or includes any computing device such as a laptop, a desktop computer, a smart phone, a tablet, etc. A user may operate, display, or otherwise execute an application 145 via the client device 125. The client device 125 can be coupled with storage or memory. In some aspects of the technical solutions described herein, the client device 125 is operated by a user associated with an organization to perform various tasks associated with the organization. The client device 125 executes the application 145. The application 145 is any platform for performing various tasks associated with the organization, such as a low-code platform, no-code platform, software-as-a-service platform (SaaS), web application, web browser, desktop application, among others. In some aspects of the technical solutions described herein, the application 145 includes one or more user-interfaces, such as a Graphical User Interface (GUI), Command-Line Interface (CLI), Voice User Interface (VUI), Touchscreen Interface, Menu-driven Interface, Natural Language Interface, Multi-modal Interface, or Document Labeling Interface, among others. It should be understood that this listing of user-interfaces is exemplary and is not intended to be construed as exhaustive or limiting.

The data processing system 105 interfaces with, communicates with, or otherwise receives or provides information with the database 110, the client device 125, among others. The data processing system 105 includes or interfaces with at least one logic device such as a server. The server is a computing device having a processor to communicate via the network 101. For example, the data processing system 105 includes a plurality of computation resources or processors. The server facilitates communications between the data processing system 105, the database 110, the client device 125, and the network 101.

In an illustrative example, the application 145 identifies a document of a first type received from a client device 125. The application 145 establishes a boundary of a portion of the document based on a digital overlay. The pre-processor 185 augments the portion of the document. The query generator 180 generates, via a trained machine learning model 135, a query using the portion of the document. The query generator 180 designs the query to facilitate an extraction of data relating to the first type. The data extractor 150 inputs the query into a second trained machine learning model to generate an output, the output comprising at least the extraction of data based on the document being of the first type. The application 145 displays, via the client device, the extracted data. The second trained machine learning model can be a trained attention embedded transformer network model 140. The model trainer 160 trains one or more machine learning models 135, or one or more attention embedded transformer network models 140 to perform the functionalities described herein.

The application 145, the pre-processor 185, the query generator 180, the data extractor 150, the validator module 155, or the model trainer 160 can each include at least one processing unit or other logic device such as a programmable logic array engine, or module configured to communicate with the data repository 115 or database 110. The application 145, the pre-processor 185, the query generator 180, the data extractor 150, the validator module 155, or the model trainer 160 can be separate components, separate microservices, a single component, or part of the data processing system 105. The system 100 and its components, such as the data processing system 105, includes hardware elements, such as one or more processors, logic devices, or circuits.

The data processing system 105 includes one or more microservices configured to be executed by the one or more processors of the data processing system 105. Each microservice communicates with the other microservices to perform a function. In some embodiments, each microservice is located on a separate server or one or more microservices are located on the same server. In some aspects of the technical solutions described herein, each microservice corresponds to a processor of the data processing system 105 or one or more microservices has their functionalities executed by the same processors. In some aspects of the technical solutions described herein, subcomponents of the data processing system 105, such as the application 145, the pre-processor 185, the query generator 180, the data extractor 150, the validator module 155, or the model trainer 160, can each be or include a microservice. In some embodiments of the technical solutions described herein, the application 145 can be hosted on the client device 125. In some embodiments, the microservices can operate or execute on the application 145. For example, in some aspects of the technical solutions described herein, the operations of the data processing system 105 can operate on or be performed by the application 145 operating on the client device 125.

In some embodiments, the application 145 can perform one or more of the functionalities of the data processing system 105, the pre-processor 185, the query generator 180, the data extractor 150, the validator module 155, or the model trainer 160. For example, the application 145 can perform some or all of the functionalities of the pre-processor 185, the query generator 180 or the data extractor 150, or the application can include the pre-processor 185, the query generator 180 or the data extractor 150. In some aspects of the technical solutions described herein, the application 145 can include one or more of the subcomponents of the data processing system 105, such as one or more of the pre-processor 185, the query generator 180, the data extractor 150, the validator module 155, or the model trainer 160.

The data processing system 105 includes an application 145 designed, constructed, and operational to identify a document received from a client device 125 and to determine a portion of the document based on a boundary established by a digital overlay input by a client device 125. The application 145 is any combination of hardware or software for identifying types of documents and for determining portions of documents according to boundaries. In some aspects of the technical solutions described herein, the first type of the document can be selected from a predetermined list by the client device 125. In some aspects of the technical solutions described herein, the type of document can be input by a user of a client device 125. In some aspects of the technical solutions described herein, the document is an image. In some aspects of the technical solutions described herein, the type of document identified by the application 145 corresponds to a domain of a plurality of domains. For example, the application 145 receives an image from a client device 125. The application 145 identifies a first type corresponding to the image via an input from the client device 125. The first type can correspond to a domain of a plurality of domains and can be selected from a predetermined list or can be input via the client device 125. For example, the predetermined list can include: W-2, Form 1040, Schedule A, Schedule B, Schedule C, Schedule D, I9, Hiring Forms, Onboarding Documents, Performance Evaluations, Exit Interview Forms, Employment Application, Form 840, Form 941, Form 944, Form 1095, Form 1099, Wage and Tax Statement, SF 52, SF 59, SF 61, SF 71, SF 75, SF 3102, Daily To-Do List, Checklist, Time Log, Activity Log, Eisenhower Matrix, or Shift, among others. It should be understood that this listing of document types is exemplary is not to be construed as exhaustive or limiting.

The application 145 identifies a document of a first type received from a client device. The application 145 establishes a boundary of a portion of the document based on a digital overlay. The application 145 selects a portion of the document based on the boundary. The application 145 creates the digital overlay using: image editing software (Adobe Photoshop, Adobe Illustrator, Sketch, Figma, Adobe XD, Affinity Designer, GNU Image Manipulation Program (GIMP), or Canva, among others), or drawing APIs and libraries (JavaFX, Qt, GIMP Toolkit (GTK), wx Widgets, Cairo, Skia, HTML5 Canvas, Simple and Fast Multimedia Library (SFML), or OpenTK, among others), among others. It should be understood that this listing of image editing software and drawing APIs is exemplary and is not to be construed as exhaustive or limiting. The application 145 can create the digital overlay via a shape, a mask, a filter, a color filter, highlighting, non-destructive editing, or framing, among others. The application 145 preserves the content and coordinates of the image when creating the digital overlay by employing techniques such as layers, alpha channels, masking, or accurate coordinate transformations, among others. It should be understood that this listing of techniques is exemplary and is not to be construed as exhaustive or limiting. The application 145 can convert a format of the document. The application 145 displays, an output of the data extractor 150 (e.g., the extracted data). The extracted data can be data extracted from the portion of the document.

The data processing system includes a pre-processor 185 designed, constructed, and operational to augment the document or the portion of the document. The pre-processor 185 can augment the document by determining a format of the document or the portion of the document. The pre-processor 185 can convert a format of the document or the portion of the document. The pre-processor can determine an organizational layout of the document or the portion of the document. The pre-processor 185 can interface with the application 145, the query generator 180, or the data extractor 150, among others.

In some aspects of the technical solutions described herein, the pre-processor 185 determines a format of the document. The format can be an arrangement of information in the document. For example, in some aspects, the pre-processor 185 can determine the document is organized by columns of information. In some aspects, the pre-processor 185 can determine the document is organized by rows of information. In some aspects, the format can be an organizational layout of the document, such as an order of sections of the document. The pre-processor 185 can determine a label for each corresponding section of the document. For example, the pre-processor 185 can determine that the document has a first section labeled "medicare tax withheld," a second section labeled "federal income tax withheld," or a third section labeled "employer identification number," among others.

In some aspects of the technical solutions described herein, the pre-processor 185 determines a format of the portion. The format can be an arrangement of information in the portion. For example, in some aspects, the pre-processor 185 can determine the portion is organized by columns of information. In some aspects, the pre-processor 185 can determine the document is organized by rows of information. In some aspects, the format can be an organizational layout of the portion, such as an order of sections of the portion. The pre-processor 185 can determine a label for each corresponding section of the portion. For example, the pre-processor 185 can determine the portion has a first section labeled "Employee Information and Attestation," or a second section labeled "Employer Review and Verification," among others.

The one or more labels can be one or more types of information contained in the document or the portion. For example, the one or more labels could be "Employment History," "Deductions," "Personal Information," "Withholding," "Employee Information," "Emergency Contact," "Pay Period," "Hours Worked," "Time In," "Time Out," "Performance Ratings," or "Feedback," among others. The pre-processor 185 can determine a section of information corresponding to each label. In some aspects of the technical solutions described herein, the pre-processor 185 determines a domain of a plurality of domains of the document according to the first type.

The pre-processor 185 can augment a section of the document by performing a modification on the section of the document. The section can be the portion, a second portion, or the document. The pre-processor 185 augments the section to improve the efficiency and accuracy of the query generation or data extraction processes. For example, the pre-processor 185 can augment the section by: increasing an image-resolution of the section, decreasing the image resolution of the section, changing a color of the section, rotating the section, inverting the section, rescaling the section, blurring the section, sharpening the section, modifying a quantitative aspect of the section, or modifying a qualitative aspect of the section. For example, a modification of a quantitative aspect of the section can be a change in resolution, a change in dimension, a change in contrast, a change in saturation, a change in sharpness, a change in noise, a change in white balance, a cropping, a scaling, or a compression, among others. A modification of a qualitative aspect of the section can be a change of a composition, a change of depth of field, an application of a monochrome color scheme, an application of color toning, selective colorization, or a composition, among others.

The pre-processor 185 can convert a file format of the section. For example, the pre-processor 185 determines a first file format of the section is JPEG. The pre-processor 185 converts the first file format to a second file format, such as XML. The pre-processor 185 can iteratively convert file formats of the section to provide inputs in the correct file format to the query generator 180 or the data extractor 150.

The data processing system 105 includes a query generator 180 designed, constructed, and operational to generate a query using the portion of the document. The query generator 180 designs the query to facilitate an extraction of data from the portion of the document. Specifically, the query generator 180 designs the query to extract data based on the document being of the first type. The query generator 180 is any combination of hardware or software for generating queries to facilitate data extraction based on a type of a document. The query generator 180 can interface with the model artifact store 130. For example, the query generator 180 selects a trained machine learning model 135 from the model artifact store 130. The query generator can select the machine learning model 135 according to the first type of the document or the portion of the document, among others. The query generator 180 inputs the portion of the document to the trained machine learning model 135.

In some aspects, the machine learning models 135 (sometimes hereinafter referred to as the machine learning model(s) 135, trained machine learning model(s) 135, or retrained machine learning model(s) 135) include one or more neural networks, decision-making models, linear regression models, natural language models, random forests, classification models, reinforcement learning models, clustering models, neighbor models, decision trees, probabilistic models, classifier models, or other such models. For example, the machine learning models 135 include natural language processing (e.g., support vector machine (SVM), Bag of Words, Counter vector, Word2Vec, k-nearest neighbors (KNN) classification, long short term memory (LSTM)), object detection and image identification models (e.g., mask region-based convolutional neural network (R-CNN), CNN, single-shot detector (SSD), deep learning CNN with Modified National Institute of Standards and Technology (MNIST), RNN based long short term memory (LSTM), Hidden Markov Models, You Only Look Once (YOLO), LayoutLM), classification ad clustering models (e.g., random forest, XGBoost, k-means clustering, DBScan, isolation forests, segmented regression, sum of subsets 0/1 Knapsack, Backtracking, Time series, transferable contextual bandit) or other models such as named entity recognition, term frequency-inverse document frequency (TF-IDF), stochastic gradient descent, Naïve Bayes Classifier, cosine similarity, multi-layer perceptron, sentence transformer, date parser, conditional random field model, Bidirectional Encoder Representations from Transformers (BERT), among others. It should be understood that this listing of machine learning models is exemplary and is not to be construed as exhaustive or limiting.

In an illustrative example, the document of the first type is an image of a W-2 form. The application 145 determines a portion of the image based on a boundary established by a digital overlay. The pre-processor 185 augments the image by changing a qualitative aspect of the image. For an illustrative example, the augmentation performed by the pre-processor 185 is a file type conversion, wherein the data extractor determines that a first file type of the image is a JPEG file and converts the first file type to a second file type, wherein the second file type is an XML file. In an illustrative example, the data extractor 150 can convert the file type from JPEG to XML using Optical Character Recognition (OCR) software (ABBYY FineReader, ABBY Cloud OCR SDK, Adobe Acrobat OCR, Tesseract OCR, OmniPage Ultimate, Readiris, Google Cloud Vision OCR, Microsoft Office OCR, or Simple OCR, among others).

The query generator 180 selects a trained machine learning model 135 from the model artifact store 130 according to the portion or the format of the portion. The query generator 180 inputs the portion a trained machine learning model 135. The trained machine learning model 135 generates a query using the portion, the first type, the format, or the document. The query is designed to enable the data extractor 150 to interface with the trained machine learning model 135 or the second trained machine learning model. The second trained machine learning model can be the trained attention embedded transformer network model 140. The query is designed to facilitate an extraction of data by the second trained machine learning model. Specifically, the query generator 180 designs the query to extract data from the document, wherein the data to be extracted is based on the document being of the first type. The query can include the portion (e.g., the portion of the document established by the boundary based on the digital overlay), a conversion of a format of the portion created by the pre-processor 185 (e.g., where the portion is a portion of an image in a JPEG format, the pre-processor 185 can convert the format from JPEG to another format, such as PNG, or the pre-processor 185 can convert from another format to JPEG). The query can include an inquiry relating to information contained by the portion. For example, the query can be a text query or a natural language query, such as "What are the names and tax withholdings of each employee?" The query can contain a key-value pair structure designed to describe object detection data sets or image segmentation data sets. For example, a key-value pair structured query designed to facilitate data extraction from a W-2 can include:

```
{
    "Employee Information": {
    "Employee Name": "John Doe",
    "Employee SSN": "123-45-6789",
    "Employee Address": "123 Main St, Cityville, State, 12345"
    },
    "Employer Information": {
    "Employer Name": "XYZ Corporation",
    "Employer EIN": "12-3456789",
    "Employer Address": "456 Business Blvd, Townsville, State, 54321"
    },
    "Income Information": {
    "Wages, nps, Other Compensation": 75000.00,
    "Federal Income Tax Withheld": 12000.00,
    "Social Security Wages": 75000.00,
    "Social Security Tax Withheld": 4650.00,
    "Medicare Wages and nps": 75000.00,
    "Medicare Tax Withheld": 1087.50
    },
    "other Information": {
    "State Tax Withheld": 2500.00,
    "Local Tax Withheld": 800.00,
    "Dependent Care Benefits": 2000.00
    }
}
```

In the foregoing example, the key-value pairs are organized into sections, such as "Employee Information," "Employer Information," "Income Information," and "Other Information." Each section in the foregoing example contains key-value pairs that represent different fields on the W-2 form (e.g., "Employee Information," "Employer Information," "Income Information," and "Other Information). The values associated with each key represent the corresponding value to be extracted from the W-2 form.

The query generator 180 determines a schema for the query according to the format of the portion of the document. The schema establishes a structured format for an input (e.g., the query) and output (e.g., the extracted data) of the second trained machine learning model. The second trained machine learning model can be a trained attention embedded transformer network 140. The structured format specified by the schema can vary according to the format of the portion of the document. For example, where the pre-processor 185 determines that the format of the portion is text-based, the query generator 180 can structure the schema to specify the structured format of text inputs, such as maximum sequence length, tokenization method. As another example, where the pre-processor 185 determines that the format of the portion is image-based, the query generator 180 can structure the schema to specify image dimensions, color channels, or normalization methods for the image. As another example, where the pre-processor 185 determines that the format of the portion is audio-based, the query generator 180 can structure the schema to specify an audio sampling rate, duration, or format. As another example, where the pre-processor 185 determines that the format of the portion is structured data (e.g., tabular data), the query generator 180 can structure the schema to specify column types, data ranges, categorical variables, or any necessary data preprocessing steps.

The query generated by query generator 180 (e.g., the output of the trained machine learning model 135) can include a classification of the document. The classification can be: of the first type of the document, of a domain of a plurality of domains corresponding to the first type of the document, or a format of the document, among others. The plurality of domains includes payroll, tax, benefits, human resources, time management, or performance management, among others. For example, the query can indicate that the first type of the document is a W-2, that the domain of the plurality of domains corresponding to the W-2 (e.g., the first type of the document) is tax.

The query facilitates an extraction of data from the document based on the document being of the first type. The query facilitates the extraction of data by specifying a class of data for the second trained machine learning model to extract from the portion of the document. The second trained machine learning model can be a trained attention embedded transformer network model 140. The class of data includes a classification of a type of the document (e.g., a specific document type, such as a W-2, or a Form 1040, among others), a classification of a domain of a plurality of domains corresponding to the document of the first type (e.g., payroll, tax, benefits, human resources, time management, or performance management, among others), content of the portion, or an entity corresponding to the first type of the document (e.g., a name of a person or nonprofit organization), among others.

Below is an illustrative example of a query generated by the query generator 180.

_EXTRACTION_TEMPLATE=***Extract and save the relevant entities mentioned in the following text together with their properties. This text is in a tabular data format. Few columns can be empty and do not mismatch entities with values. There are four employee names in this data. The text contains payroll information of multiple employees such as employee name, id, hours, earnings, withholdings, deductions, net pay allocations, etc.

Only extract the properties mentioned in the 'information_extraction' function. If a property is not present and is not required in the function parameters, do not include it in the output.

Passage:

{input}

The data processing system 105 includes a data extractor 150 designed, constructed, and operational to extract, using a second trained machine learning model, data from the portion of the document. The second trained machine learning model can be a trained attention embedded transformer network model 140. The data extractor 150 is any combination of hardware and software for extracting data based on the document being of the first type. For example, the data extractor 150 generates an output of a second trained machine learning model based of the portion of the document input to the trained machine learning model 135.

In some aspects, the second trained machine learning model is a trained attention embedded transformer network model 140 (sometimes hereinafter referred to as attention embedded transformer network model(s) 140, trained attention embedded transformer network model(s) 140, or retrained attention embedded transformer network model(s) 140). The second machine learning model can include one or more Large Language Models (LLMs), Generative Adversarial Models (GANs), Variational Autoencoders (VAEs), Transformer-based Language Models, Recurrent Neural Networks (RNNs), Boltzmann Machines, Restricted Boltzmann Machines (RBMs), Deep Belief Networks (DBNs), Autoencoders, Markov Chain Models, Hopfield Networks, Long Short-Term Memory Networks (LSTMs), Sequence-to-Sequence Models, Conditional Generative Models, Adversarial Autoencoders (AAEs), Hierarchical Models, or other such models. For example, the models include LLMs (Generative Pre-Trained Transformer 2 (GPT-2), GPT-3, GPT-4, Bidirectional Encoder Representations from Transformers (BERT), Talk-To-Text Transfer Transformers (T5), Robustly Optimized BERT Approach (ROBERTa), or XLNet, among others), GANs (Deep Convolutional Generative Adversarial Network (DCGAN), Wasserstein Generative Adversarial Network (WGAN), Cycle-Consistent Generative Adversarial Network (CycleGAN), Information Maximizing Generative Adversarial Network (InfoGAN), Style Generative Adversarial Network (StyleGAN), or Progressive Generative Adversarial Network (ProGAN), among others), VAEs (Vanilla VAE, Conditional Variational Autoencoder (CVAE), Denoising Variational Autoencoder (DVAE), Beta-VAE, Variational Latent Autoencoder (VLAE), or Ladder Variational Autoencoder (LVAE), among others), Transformer-based Language Models, RNNs (Vanilla RNN, Gated Recurrent Unit (GRU), SimpleRNN, or Clockwork RNN, among others) Boltzmann Machines (Restricted Boltzmann Machine (RBM), Gaussian-Bernoulli Boltzmann Machine (GBM), Bernoulli-Bernoulli Boltzmann Machine (BBM), Discrete and Continuous Restricted Boltzmann Machine (DCRBM), Binary-Binary Restricted Boltzmann Machine (BBRBM), or Gaussian-Binary Product Restricted Boltzmann Machine (GBPRBM), among others), DBNs (Mixture of Bernoulli DBNs, Mixture of Gaussians DBNs, or Deep Credal Networks (DCNs), among others), LSTMs (Vanilla LSTM, Bidirectional LSTM, Stacked LSTM, Peephole LSTM, Attention LSTM, or Zoneout LSTM, among others). It should be understood that many specific machine learning models can also serve as specific attention embedded transformer network models. It should also be understood that this listing of second trained machine learning models is exemplary and is not to be construed as exhaustive or limiting.

The data extractor 150 inputs the query into a second trained machine learning model to generate an output. The output can be an extraction of data from the document. The second trained machine learning model can be a trained attention embedded transformer network model 140. The output includes at least an extraction of data based on the document being of the first type. The output can include: a classification of the document of the first type (e.g., a specific document type, such as a W-2, or a Form 1040, among others), a classification of a domain of a plurality of domains corresponding to the document of the first type (e.g., payroll, tax, benefits, human resources, time management, or performance management, among others), content of the portion (e.g., a digital recreation of content contained in the portion of the document determined based on the boundary, such as an employee's information on an I9 form), an entity corresponding to the first type of the document (e.g., a name of a person or nonprofit organization), or an accuracy metric that compares the content of the portion with the output of the second trained machine learning model. The query can include quantitative or qualitative data.

In some aspects of the technical solutions described herein, the query generator 180 includes the format or the one or more labels as part of the query. The data extractor 150 inputs the query into the second trained machine learning model (e.g., the trained attention embedded transformer network model 140). In some aspects of the technical solutions described herein, the data extractor 150 determines a new format or a new label for the extracted data. The data extractor 150 determines the new format or the new label according to an ontological library 175 corresponding to the domain of the plurality of domains of the document. In some aspects of the technical solutions described herein, the data extractor 150 templates the extracted data using the new format or the new label.

The following is an illustrative example of the kinds of data that can be extracted by the second trained machine learning model: rate, frequency, reg_hours, ot_hours, hol_hours, reg_amount, ot_amount, hol_amount, ytd_reg_hours, ytd_ot_hours, ytd_hol_hours, ytd_reg_amount, ytd_ot_amount, ytd_hol_amount, fitw_taxable, fitw_amount, fitw_ytd_tax, fitw_ytd_amount, med_taxable, med_amount, and med-ytd_tax. The second trained machine learning model can be an attention embedded transformer network model 140.

In some aspects of the technical solutions described herein, the data extractor 150 determines an ontological library 175 according to the domain of the plurality of domains (e.g., the domain indicated by the query). The query can include a format determined according to the ontological library 175. The data extractor 150 templates the output (e.g., the extracted data) according to an ontological library 175 (sometimes hereinafter referred to as ontological libraries 175) corresponding to the domain.

An ontology library 175 is any memory, storage, or cache for storing predetermined terms for specific entities within a domain. By templating the output of the second trained machine learning model (e.g., the trained attention embedded transformer network model 140) according to an ontology library 175, the technical solutions described herein address the technical problems of error propagation and lack of consistency where multiple client devices are extracting data from the same domain. By implementing ontology libraries 175, the data extractor ensures consistency and accuracy of the second trained machine learning model (e.g., the trained attention embedded transformer network model 140) outputs from a plurality of client devices 125. Other systems that do not implement ontology libraries 175 lack the technical ability of standardizing outputs within the same domain or type of document from multiple client devices within an entity. By utilizing ontological libraries 175, the data extractor increases the efficiency and accuracy of templated document data extraction.

For an illustrative example, a first client device receives a document of a first type. The application 145 identifies a document of a first type as a W-2. The data extractor 150 determines a domain of the document to be tax. The data extractor 150 templates the output of the second trained machine learning model (e.g., the trained attention embedded transformer network model 140) according to an ontological library 175 corresponding to tax. The ontological library 175 corresponding to tax contains predefined terms for a variety of entities relating to tax. A second client device receives a second document of a second type. Although the second document does not have identical content as the first document (e.g., the second document uses different labels than the first document, although both documents utilize the same entities), the application 145 determines the second document of the second type is a W-2. The data extractor 150 determines the domain of the W-2 to be tax. The data extractor 150 templates the extracted data (e.g., the output) of the second trained machine learning model (e.g., the trained attention embedded transformer network model 140) according to the ontological library 175 corresponding to tax. Accordingly, although the first document and the second document used different labels to describe the same entities, the data extractor 150 templated both outputs using the same ontological library 175, thus providing a uniform use of ontological terms to describe the entities of the W-2 forms.

The data processing system 105 facilitates iterative repetitions of data extraction. In some embodiments, the application 145 determines, responsive to the display of the extracted data, a second portion of the document based on a second boundary established by a second digital overlay. The data extractor 150 generates, via the trained machine learning model 135, a second query using the second portion of the document determined based on the second boundary, wherein the second query is designed to facilitate a second extraction of information relating to the first type (e.g., the first type of the document). The data extractor 150 inputs the second query into the second trained machine learning model (e.g., the trained attention embedded transformer network model 140) to generate a second output. The second output includes at least a second extraction of data (e.g., extracted new data) based on the document being of the first type. The application 145 displays, the second output.

The data processing system 105 includes a validator module 155 designed, constructed, and operational to validate outputs (e.g., the extracted data). The validator module 155 is any combination of hardware or software for validating outputs (e.g., extracted data) of the second trained machine learning model (e.g., the trained attention embedded transformer network model 140). The validator module 155 determines a validation score for the output (e.g., extracted data). The validator module 155 determines the validation score using holdout validation, cross-validation, metrics and loss functions (e.g., accuracy, precision, recall, F1-score, ROC-AUC, or regression metrics such as Mean Squared Error (MSE) or Mean Absolute Error (MAE), among others), confidence intervals and uncertainty estimation, ensemble methods (e.g., bagging, boosting, or stacking), visual inspection and error analysis, domain-specific validation techniques (BLEU score or ROUGE score), human evaluation, iterative improvement, adversarial testing, scenario testing, among others.

The validator module 155 determines that the validation score of the extracted data is above a threshold. The threshold can be predetermined or input by a user of a client device 125. In response to the validator module 155 determining the validation score is above the threshold, the validator module 155 cause the application 145 displays the extracted data via the client device 125.

In some embodiments of the technical solutions described herein, the validator module 155 determines a validation score for the output (e.g., the extracted data). The validator module 155 determines that the validation score is below a threshold. In response to this determination, the validator module 155 causes the data extractor 150 to generate a new output (e.g., the data extractor 150 extracts new data). The validator module 155 determines a new validation score for the new output. The validator module 155 determines that the new validation score is above the threshold. In response to this determination, the validator module replaces the output with the new output.

In some embodiments of the technical solutions described herein, the validator module 155 determines the validation score via the trained machine learning model 135 by providing the output (e.g., the extracted data) of the second trained machine learning model (e.g., the trained attention embedded transformer network model 140) as an input to the trained machine learning model 135 to create a second output. The validator module 155 determines the validation score by comparing the second output (e.g., extracted new data) with the output (e.g., the extracted data). For example, the validator module 155 determines the validation score by determining a loss metric when comparing the second output with the output.

In some embodiments of the technical solutions described herein, the validator module 155 determines the validation score using the second trained machine learning model (e.g., the trained attention embedded transformer network model 140) a by providing the extracted data) as an input to the second trained machine learning model (e.g., the trained attention embedded transformer network model 140) to create a second output (e.g., extracted new data). The validator module 155 determines the validation score by comparing the second output (e.g., the extracted new data) of the second trained machine learning model (e.g., the trained attention embedded transformer network model) with the output (e.g., the extracted data) of the second trained machine learning model (e.g., the trained attention embedded transformer network model 140). For example, the validator module 155 determines the validation score by determining a loss metric when comparing the second output with the output.

In some embodiments of the technical solutions described herein, the validator module 155 determines a first validation score via the trained machine learning model 135 by providing the output (e.g., the extracted data) to the trained machine learning model 135 as a first input to create a second output (e.g., extracted new data). The validator module 155 determines a second validation score via the second trained machine learning model (e.g., trained attention embedded transformer network model 140) by providing the output (e.g., the extracted data) as an input to the second trained machine learning model (e.g., the trained attention embedded transformer network model 140) as a second input to create a third output (e.g., second extracted new data). The validator module 155 compares the first validation score with the second validation score to determine that both the first validation score and the second validation score are above the threshold. In this manner, the technical solutions described herein increase the accuracy of the second machine learning model (e.g., the trained attention embedded transformer network model 140) by using trained machine learning models 135 or trained attention embedded transformer network models 140 to validate the output of the second trained machine learning model (e.g., the trained attention embedded transformer network model 140).

In some embodiments of the technical solutions described herein, the validator module 155 determines a validation score for the query (e.g., the output of the trained machine learning model 135). The validator module 155 determines the validation score by providing at least a section of the query as a new input to the trained machine learning model 135, to the second trained machine learning model (e.g., the trained attention embedded transformer network model 140), or to both the trained machine learning model 135 and the second trained machine learning model (e.g., the trained attention embedded transformer network model 140).

For example, where the query includes a natural language text query about an I9 (e.g., "What employee information does this I9 form contain) and an image of a first I9, the validator module 155 can modify the query by replacing the image of the first 19 with an image of a second 19. In response to this replacement, the validator module 155 can provide the query as a new input to the second trained machine learning model (e.g., the trained attention embedded transformer network model 140) and determine a validation score for the query. For another example, where the query includes a natural language text query portion about a W-4 and an image portion of a W-4, the validator module 155 can provide the query as a first input to the second trained machine learning model (e.g., the trained attention embedded transformer network model 140). The validator module 155 can cause the trained machine learning model 135 to create a new query including a key-value pair query portion and an image portion. The validator module 155 can provide the new query as a second input to the second trained machine learning model (e.g., the trained attention embedded transformer network model 140) to create a new output. The validator module 155 can determine a validation score by comparing the output with the new output. In this manner, the technical solutions described herein leverage trained machine learning models 135 or the trained attention embedded transformer network models 140 to create robust query engineering and robust outputs. By creating and manipulating an interface between trained machine learning models 135 or trained attention embedded transformer network models 140, the technical solutions described herein provide technical improvements to query engineering approaches.

Below is an illustrative example of an embodiment of an output (e.g., extracted data) of the second trained machine learning model (e.g., the trained attention embedded transformer network model 140), wherein the validation score of the output was above the threshold.

Templatized Digitization Service

API spec for Templatized Digitization Service:

Inbound ContentType: application/pdf

Outbound ContentType: application/json

Client Service makes a POST request call to the Templatized Digitization Service, which returns JSON of the extracted data.

Supported files:

p45

940/941 sbs sales order federal tax deferral

URL POST: /api/pibrain-template-infer/v0/extraction

Request Body

PDF File Payload (file)

Example

Note: This is a file upload, please look for α parameter.

Curl -X 'POST' \

'http://<ENV-URL>/api/pibrain-template-infer/v0/extraction' \

-H 'accept: application/json' \

-H 'Content-Type: multipart/form-data' \

-F 'file-αeSignedSalesOrder.pdf;type-application/pdf'

Example Response:

Success

The data processing system 105 includes a model trainer 160 designed, constructed and operational to train, maintain, or identify the machine learning models (e.g., the machine learning models 135 or the attention embedded transformer network models 140). The model trainer 160 trains the models using one or more of the documents, the portion of the document, the query, a portion of the query, or a combination thereof, among others. The model trainer 160 maintains, updates, or retrains the models. The model trainer 160 identifies the models for use by other subcomponents of the data processing system 105. The model trainer 160 stores or modifies the models in the model artifact store 130. The model trainer 160 can train machine learning models 135 and attention embedded transformer network models 140 in parallel, series, or a combination thereof.

The model trainer 160 trains the models (e.g., the machine learning models 135 or the attention embedded transformer network models 140). The model trainer 160 establishes or generates the models using a training data set including at least one of the documents, the portion of the document, the query, or a portion of the query, among others. The model trainer 160 uses the training data set constructed from data acquired from or associated with a multitude of client devices 125 to train the models for use with a client device 125. For example, the model trainer 160 trains the models using data associated with client devices 125, using data associated with the document, using data associated with the portion of the document, using data associated with the query, using data associated with a portion of the query, using data associated with one or more domains, using data associated with an entity associated with a client device 125, using data associated with the ontological libraries, among other data. In some embodiments, the model trainer 160 trains the models using a training data set constructed from data associated with the client device 125 during prior sessions.

The model trainer 160 trains the second machine learning model (e.g., the attention embedded transformer network model 140) to recognize a first pattern in an input sequence of the second machine learning model (e.g., the attention embedded transformer network model 140) and generate an output having a second pattern similar to the first pattern. The second machine learning model (e.g., the attention embedded transformer network model 140) can include a transformer architecture. The transformer architecture allows the second machine learning model (e.g., the attention embedded transformer network model 140) to weigh different components of the input sequence differently during processing. Additionally, the second machine learning model (e.g., the attention embedded transformer network model 140) can include an attention mechanism. The attention mechanism allows the second machine learning model (e.g., the attention embedded transformer network model 140) to focus on different parts of the input sequence when generating the output. The attention mechanism enables the second machine learning model (e.g., the attention embedded transformer network model 140) to understand a context and a relationship between different components of the input sequence, such as, for example, between words of an input sequence. The second machine learning model (e.g., the attention embedded transformer network model 140) can include a tokenizer. The tokenizer tokenizes the input sequence, such as an input text, into smaller units, such as words or sub-words. The tokenizer converts the tokens into vector representation using an embedding layer. Tokenization enables the second machine learning model (e.g., the attention embedded transformer network model 140) to understand the input sequence. The model trainer 160 trains the second machine learning model (e.g., the attention embedded transformer network model 140) to recognize the first pattern in the input sequence and generate an output having a second pattern similar to the first pattern by leveraging the transformer architecture, attention mechanism, or embedding layer, among others, to break down and understand the input sequence, and focus on different parts of the input sequence when generating the output. For example, where an input sequence for an attention embedded transformer network 140 (e.g., a query) includes a document of a first type, the model trainer 160 can train an attention embedded transformer network to recognize a first pattern in the first type of the document (e.g., a format of the document, such as different components corresponding to an ontological library 175), and generate an output having a second pattern similar pattern to the first pattern (e.g., a digital recreation of the document of the first type, wherein the model trainer 160 trains the attention embedded transformer network to incorporate an ontological library into the output).

In some embodiments, the client device 125 can be associated with one or more entities. The entities can be employees, organizations, companies, non-profits, institutions, other such organizations involving one or more employees, personnel, or computing devices. In some aspects of the technical solutions described herein, the client device 125 is owned by, operated by, or used by one or more entities for tasks such as performing routines, operations or tasks associated with an employee of the entity. In some aspects of the technical solutions described herein, the model trainer 160 trains the models (e.g., the machine learning models 135 or the attention embedded transformer network models 140) with a training data set constructed from data collected from one or more entities associated with the client device 125.

The model trainer 160 instructs the application 145 or the data extractor 150 to aggregate the training data set to train, generate, or establish the models (e.g., the machine learning models 135 or the attention embedded transformer network models 140). The model trainer 160 instructs, causes, or pushes the application 145 or the data extractor 150 to receive or retrieve the training data set at any time for training the models. The model trainer 160 trains the models using the training data set, a subset of the training data set, historical data, input data by a user of a client device 125 (e.g., a portion of a document based on a boundary established by a digital overlay), or others of the inputs described herein. The model trainer 160 segments, subsects, divides, or otherwise creates subsets of the training data set to train the models. The model trainer 160 can divide the training data set based on a percentage of information. For example, the model trainer 160 can divide the training data set into two subsets wherein the first subset can include 25% of the information in GB and the second subset includes 75% of the information in GB. The model trainer 160 can divide the training data set based on a data type, a time received, a type of the document, a portion of the document, a format of the document, a domain associated with the document, a plurality of types associated with a domain associated with the document, the query, a component of the query, or a type of the query, among others.

The model trainer 160 creates a first training data set through an action performed on the document (e.g., the document of the first type received by the application 145 from the client device 125). The model trainer 160 creates a new document by performing an action on the document. The action performed on the document is a rotation, an inversion, a rescaling, a blurring, a sharpening, a modification of a quantitative aspect, a modification of a qualitative aspect, or a conversion of a file format of the document, among others. The first training data set includes the new document. The model trainer 160 inputs a second training data set to a machine learning model 135. The second training data set includes the first training data set and the document.

In some embodiments of the technical solutions described herein, the model trainer 160 performs a first action on the first section of the document or a second action on a second section of the document. In some embodiments of the technical solutions described herein, the model trainer 160 creates a first new document by performing an action on the document, a second new document by performing a second action on the document, a third new document by performing a third action on the document, or a fourth new document by performing a fourth action on the document. The first training data set includes the first new document, the second new document, the third new document, or the fourth new document. In some embodiments, the model trainer 160 creates a first new document by performing a first action on the document. Responsive to the creation of the first new document, the model trainer 160 creates a second new document by performing the first action on the first new document, or by performing a second action on the first new document. In some embodiments, the model trainer 160 iteratively creates a first training data set by performing a plurality of actions on the document to create a plurality of new documents, wherein the first training data set includes the plurality of new documents.

In some embodiments of the technical solutions described herein, the model trainer 160 creates a first training data set including a rotation of the first document. The model trainer 160 inputs a second training data set to a machine learning model 135 to train the machine learning model 135. The second training data set includes the first training data set and the document.

For an illustrative example, the model trainer 160 creates a first new document by rotating the document 90 degrees clockwise, a second new document by rotating the document 180 degrees clockwise, a third new document by rotating the document 270 degrees clockwise, a fourth new document by inverting the document, and a fifth new document by blurring the document. The first training data set includes the first new document, the second new document, the third new document, the fourth new document, or the fifth new document. The model trainer 160 creates the second training data set by aggregating the first training data set with the document. The model trainer 160 inputs the second training data set into a machine learning model 135 to train the machine learning model 135. In this manner, the technical solutions described herein address the technical challenge of requiring large amounts of data to train machine learning models 135 by generating a training data set by performing at least one action on the document. In a similar manner, the model trainer 160 can create training data sets to train the second machine learning model (e.g., the attention embedded transformer network models 140) by generating a plurality of new documents through at least one action performed on the document. For example, the model trainer 160 creates at least one new document by performing an action (e.g., a rotation) on the document. The model trainer 160 inputs a first training data set into a machine learning model. The first training data set includes the at least one new document and the document. By training the machine learning model using the first training data set, the model trainer 160 enables the machine learning model to become a trained machine learning model 135.

In some aspects of the technical solutions described herein, the model trainer 160 modifies inputs to the trained machine learning model 135 (e.g., the input) or to the trained attention embedded transformer network model 140 using efficient feature encoding. Efficient feature encoding refers to generating inputs for the machine learning models 135 or the attention embedded transformer network models 140 using the document of the first type received from the client device 125. Efficient feature encoding reduces time and computational power for a model (e.g., a machine learning model 135 or an attention embedded transformer network model 140) to produce outputs (such as a query or a data extraction) by providing inputs corresponding to a format based on the document. In this matter, a model (e.g., a machine learning model 135 or an attention embedded transformer network model 140) receives structure inputs based on documents received from client devices 125 to streamline training a model (e.g., a machine learning model 135 or an attention embedded transformer network model 140), generating outputs (e.g., a query or a data extraction), among others.

The model trainer 160 feeds, supplements, or provides an input training data set as an input to the models (e.g., the machine learning models 135 or the attention embedded transformer network models 140). In some embodiments, the model trainer 160 structures and provides the training data set to the model according to a type of the model (e.g., machine learning models 135 can be trained using different training data sets than attention embedded transformer network models 140). The inputs are or include the inputs as described herein in addition to the input training data set. The model trainer uses the input training data set to train the models based on known outputs of the input training data set. The input training data set can be annotated by a user of a client device 125 or otherwise have known outputs or outcomes. By providing the input training data set with the inputs and known outputs to the models, the model trainer 160 generates the trained models. For example, the input training data set includes a large variety of data types, documents, portions of documents, queries, components of queries, among others. The input training data set can be marked to distinguish each attribute of the input training data set. The model trainer 160 generates the trained models by providing the inputs to create the known outputs. This process can be iterative and can utilize any of the inputs or models described herein.

The model trainer 160 validates the trained models (e.g., the trained machine learning models 135 or the trained attention embedded transformer network models 140) using a test data set. With generation of the models, the model trainer 160 provides inputs based on the test data set to determine a validity of each of the models. The validity of each of the models can relate to an error. The error is the difference between the known outcomes of the test data set and actual outcomes when inputs based on the test data set are provided to the models. For example, the test data set includes a known input and outcome. Upon providing the known input to a model trained to accept that input, the model provides the known outcome, or can provide a different, erroneous outcome. This comparison between the known outcome and the model-generated outcome can be repeated for various inputs of a model to generate an overall error score or rate. The error score or rate relates to the validity of the model. If the error score or rate for the model exceeds a threshold error, the model is considered to be invalid or erroneous. If the error score or rate for the model is at or below the threshold error, the model is considered valid. In this manner, each model is validated.

The model trainer 160 retrains the models (e.g., the machine learning models 135 and the attention embedded transformer network models 140). The model trainer 160 can retrain the models responsive to the error score of one or more of the models being above a threshold error. In some cases, the model trainer 160 determines that the error score of the models is above the threshold error (e.g., invalid) responsive to generation of the models by the model trainer 160. For example, the model trainer 160 determines that a model is invalid prior to storing the models in the model artifact store 130. The model trainer 160 can check the models periodically to determine the validity of the models. For example, a model that once was valid can drift, or become less valid or have a higher error score over time. The model trainer 160 determines that the models are invalid or above a threshold error at any time. The model trainer 160 checks the validity of the models stored in the model artifact store, the models generated by the model trainer 160, or other models of the system 100.

Upon the model trainer 160 determining that one or more models (e.g., one or more machine learning models 135 or one or more attention embedded transformer network models 140) are invalid (e.g., the error score is above the threshold error), the model trainer 160 instructs the application 145 or the data extractor 150 to aggregate, collect, or retrieve a third training data set. With receipt of the third training data set, the model trainer 160 retrains the models. The model trainer 160 divides the third training data set into subsets, such as a third training input data and a third test data. The model trainer 160 incorporates, combines, or adds the third training data to the training data. With the aggregation of the second training data set, the model trainer 160 provides further inputs and known outcomes to further train the models. The model trainer 160 retrains the models with an error score above a threshold (e.g., the invalid models), all of the models, or selected models. The model trainer 160 can train the models or a subset of the models in response to the elapse of a period of time. For example, the model trainer 160 retrains a first model every week, a second model every year, a third model upon its error score exceeding the threshold error for the third model, or never retrains a fourth model.

The model trainer 160 checks the retrained models (e.g., the retrained machine learning models 135 or the retrained attention embedded transformer network models 140) for validity. The model trainer 160 checks or tests the retrained models as described herein, by comparing an error score of each model with a threshold error for each model. Upon the model trainer 160 determining that one or more of the retrained models are invalid, the model trainer 160 aggregates a fourth training data set and repeats the retraining process. The retraining process can be repeated until the error score of the model is below the threshold error. The model trainer 160 can issue an alert or notification if the model fails testing or retraining a threshold number of times.

Upon the model trainer 160 determining that the retrained models (e.g., the retrained machine learning models 135 or the retrained attention embedded transformer network models 140) or the trained models (e.g., the trained machine learning models 135 or the trained attention embedded transformer network models 140) are valid, the model trainer 160 stores the models in the model artifact store 130. In some cases, the model trainer 160 replaces a first model with a retrained version of the first model. The model trainer 160 replaces the first model with the retrained version of the first model based on input from a user of a client device 125, or based on the first model having an error score above the threshold. In this manner, models which have drifted, become erroneous, or no longer represent the data 165 are replaced by the model trainer 160 to ensure validity of the system 100.

The model trainer 160 generates and validates the models (e.g., the machine learning models 135 or the attention embedded transformer network models 140) in parallel, series, or a combination thereof. For example, the model trainer 160 generates, validates, or stores a machine learning model 135 concurrently with an attention embedded transformer network model 140. The model trainer 160 generates, validates, or stores an attention embedded transformer network model 140 prior to the generation, validation, or storage of a machine learning model 135. In some aspects of the technical solutions described herein, a subsequent model uses as input an outcome of a prior model. In these aspects of the technical solutions described herein, the model trainer 160 generates, validates, or stores subsequent models after prior models.

The application 145, the pre-processor 185, the query generator 180, the data extractor 150, the validator module 155, and the model trainer 160 each store data about model (e.g., machine learning model 135 or attention embedded transformer network model 140) performance or model usage in the model performance database 170. The model performance database 170 maintains, includes, stores, or otherwise hosts data about model performance or usage. Data about model performance or usage can be aggregated, accumulated, calculated, generated, or otherwise available to the application 145, the pre-processor 185, the query generator 180, the data extractor 150, the validator module 155, or the model trainer 160. The model performance database arranges values of performance data or usage data in a specified manner, such as a table, a list, or other defined data structure. The model performance database 170 hosts qualitative and quantitative data.

The data repository 115 is a memory, storage, or cache for storing information or data structures of the system 100. The data repository 115 allows the data to be accessed by any components of the system 100, such as by communication methods described herein. The data repository 115 can include data 165, a model artifact store 130, a model performance database 170, or an ontology library 175, among others. The model artifact store 130 includes at least machine learning models 135 or attention embedded transformer network models 140. The information in the data repository 115 is stored in any kind of memory, such as a cloud or hard drive. The data repository 115 includes, for example, random access memory (RAM), dynamic random access memory (DRAM), static random access memory (SRAM), error correcting code (ECC), read only memory (ROM), programmable read only memory (PROM), or electrically erasable read only memory (EEPROM). The information or data structures (e.g., tables, lists, or spreadsheets) contained within the data repository 115 is dynamic and changes periodically (e.g., daily or every millisecond); via input from a user (e.g., a user operating the client device 125); via information from the database 110, or the client device 125, transmitted through the network 101; via inputs from subcomponents of the data processing system 105 (e.g., the application 145, the pre-processor 185, the query generator 180, the data extractor 150, the validator module 155, or the model trainer 160), or via an external update to the system 100. For example, the models (e.g., machine learning models 135 or attention embedded transformer network models 140) within the data repository 115 change or are updated responsive to an indication from the model trainer 160.

The operations of the data processing system 105 are performed for each subsequent receipt of a document of a first type from a client device 125. The technical solutions described herein are able to leverage the interface of machine learning models and attention embedded transformer network models to provide more accurate data extraction. In addition, the technical solutions described herein are able to provide robust, standardized data extraction by specifying, through the trained attention embedded transformer network model 140, a standardized schema for outputs of the trained attention embedded transformer network model 140. By incorporating the use of ontological libraries 175, the technical solutions described herein provide technical advantages of not only being able to accurately extract data across a variety of domains, but also standardizing the output of the data extraction, thus increasing the overall accuracy of data extraction by multiple client devices 125 associated with an entity.

Figure 2:
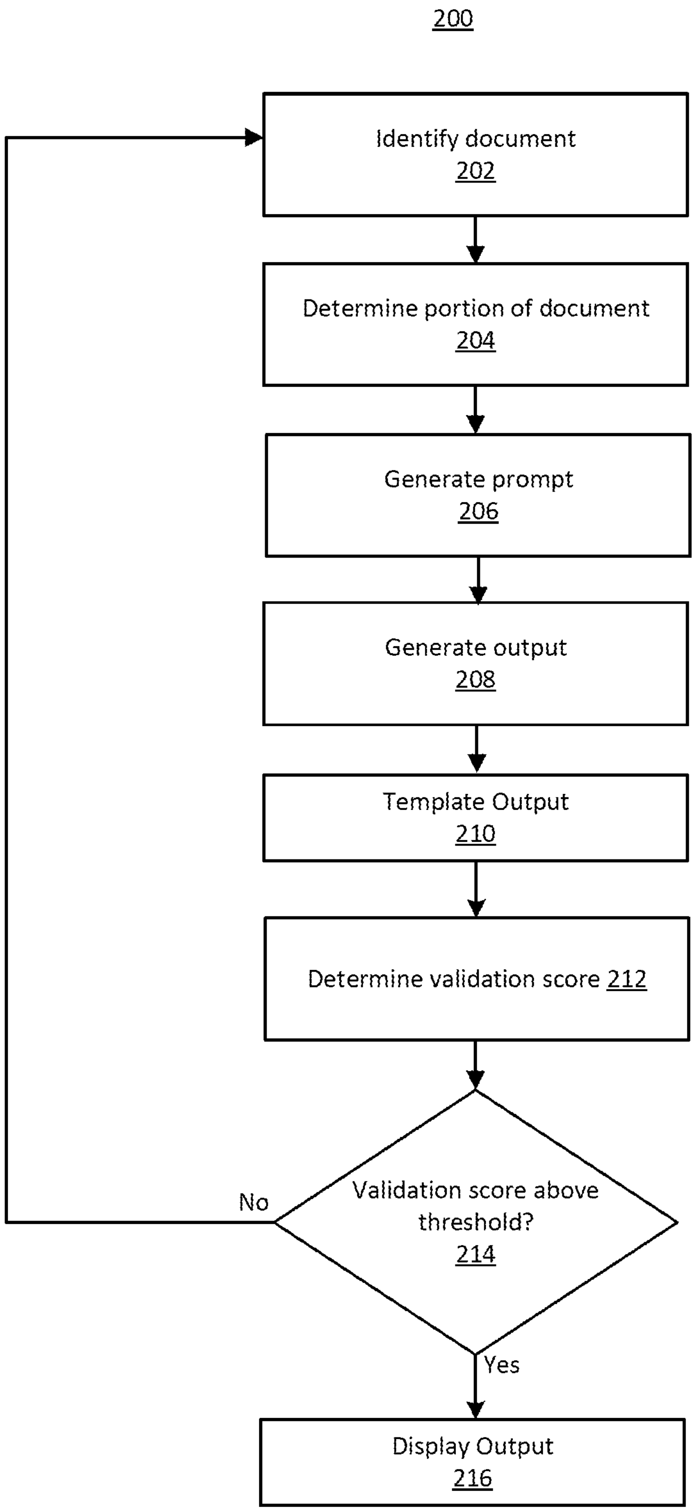
FIG. 2 depicts an example method for templating document data extraction.
Figure 8:
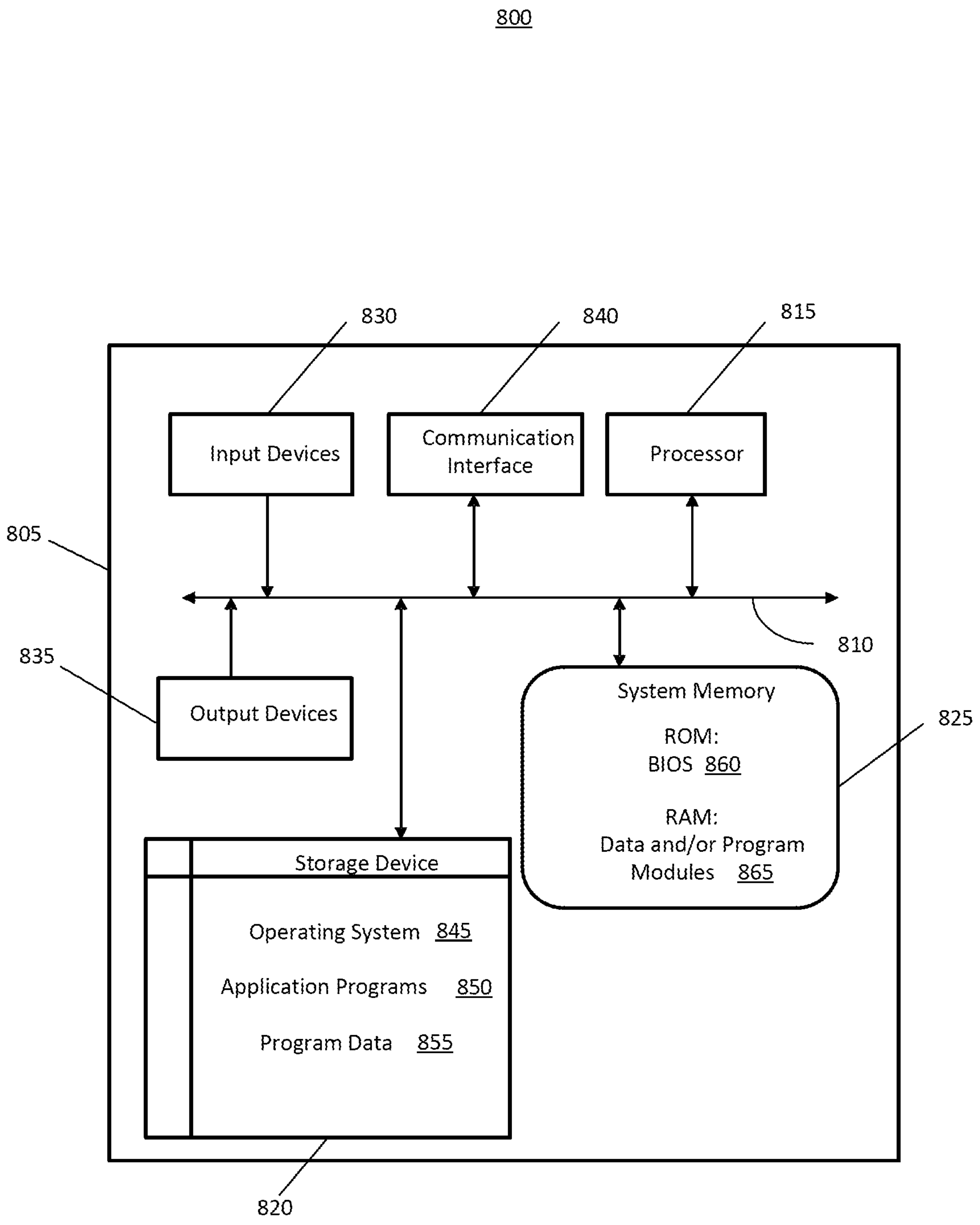
FIG. 8 depicts an illustrative architecture of a computing system implemented in embodiments of the technical solutions described herein.
Figure 9:
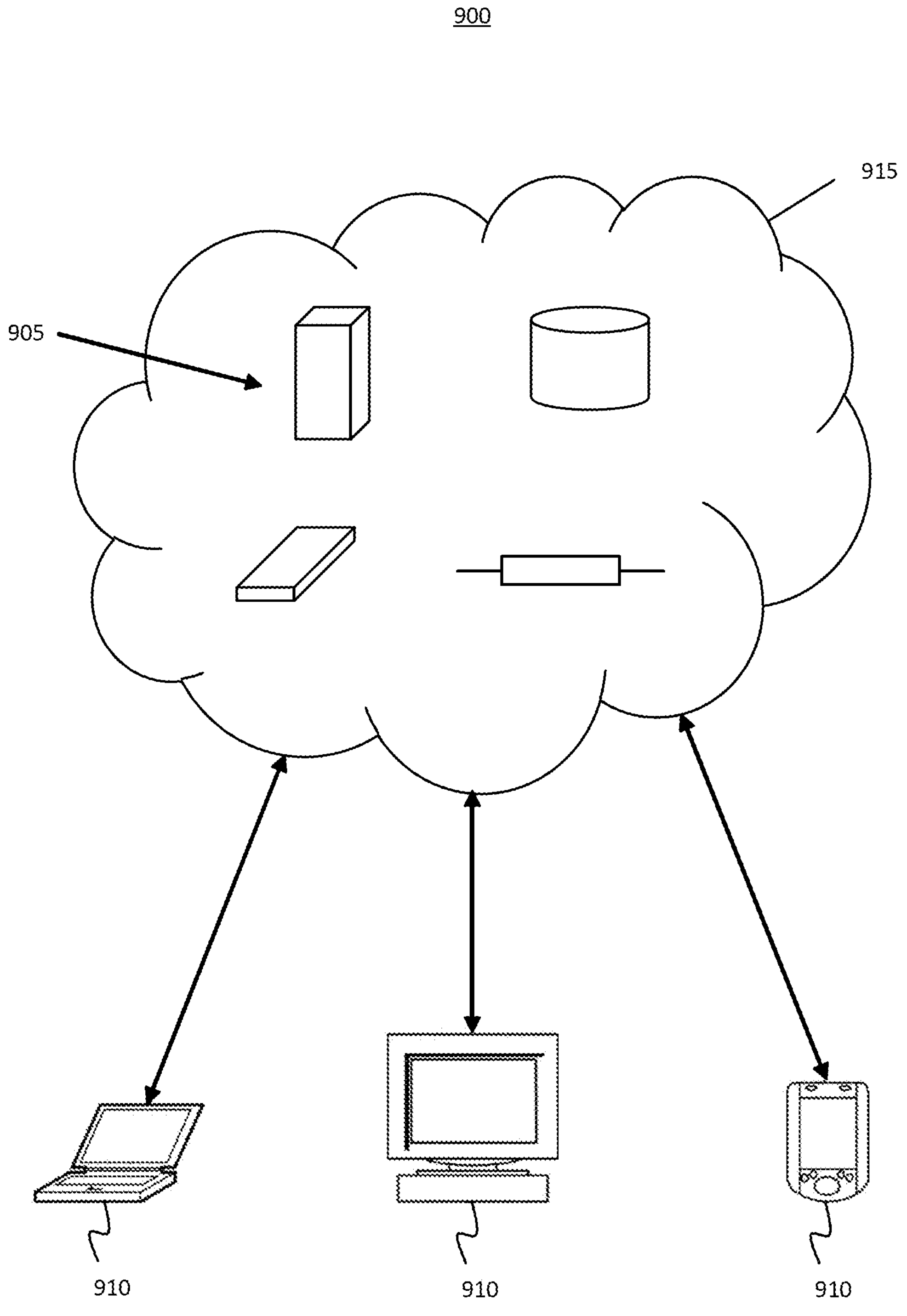
FIG. 9 shows an exemplary cloud computing environment in accordance with aspects of the technical solutions described herein.

FIG. 2 depicts an example method 200 for templating data extraction according to one or more aspects of the technical solutions described herein. The method 200 is performed by one or more systems or components as depicted in FIG. 1, FIG. 8, or FIG. 9, including, for example, a data processing system. At ACT 202, the method 200 includes the data processing system identifying a document of a first type. The document can be received from a client device, such as a client device 125. The client device can host an application, such as the application 145. The data processing system can determine the first type of the document from a predetermined list or input from a user of the client device, among others. The predetermined list can include, W-2, W-4, 1099-MISC Form, I-9 Form, direct deposit authorization form, Form W-9, Form I-4, benefits enrollment form, health insurance enrollment form, among others. The client device can include a display system, a windowing system, a user input handling system, widgets and controls, an event-driven programming system, a layout management system, a graphics rendering system, one or more interaction paradigms, or accessibility features, among others. The data processing system can determine a domain associated with the first type. The first type can be a sub-component of the domain (e.g., multiple types can correspond to a domain). For example, the data processing system determines the document of the first type is a W-2. Responsive to this determination, the data processing system determines that the domain corresponding to the first type is tax.

The data processing system can receive the document in real-time, via a data stream, periodically (e.g., every 1 second, 2 seconds, 3 seconds, 5 seconds, 10 seconds, 15 seconds, 20 seconds, 30 seconds, 60 seconds, or other time interval). The data processing system can request the document from the client device, such as via a poll, query, ping, or fetch operation. The data processing system can request the document responsive to a condition or event, such as detecting a new user profile associated with the application, or a new entity associated with the client device, among others.

At ACT 204, the data processing system determines a portion of the document based on a boundary established by a digital overlay. The client device can create and place the digital overlay through a variety of methods, such as, for example, image editing software (Adobe Photoshop or GIMP, among others), graphical user interface-based image processing tools (Microsoft Paint or macOS preview, among others), or built-in editing features in mobile application graphical user interfaces, among others. The client device can define the portion encompassed by the digital overlay by creating a mask. The client device can create the digital overlay using overlay generation, wherein an overlay image is generated to represent the digital overlay. The overlay image can be blended with the document based on the mask. During the process of creating the digital overlay, the client device preserves the coordinates of the document. This can be achieved through various means, such as mapping pixels in the overlay to their corresponding positions in the document based on the mask.

The data processing system can augment the document or the portion of the document. Augmentation can include actions such as enhancing a quality of the document, changing a color of the document, rotating the document, or changing a file format of the document, among others. For example, the data processing system can create a new file format corresponding to the portion, such as an extensible Markup Language (XML) file format.

At ACT 206, the data processing system generates a query by inputting the portion of the document based on the boundary into a trained machine learning model. The data processing system trains a machine learning model to generate a query having multiple components. For example, the query includes a text component, an image component, a schema or structure, special tokens or markers, conditional statements, or instructions for content preservation, among others. The data processing system can structure the text component using natural language text, key-value pairs, markdown or rich text, code snippets, or user input tags, among others. The image component can be the document, or the portion of the document, among others. The schema can be a structured aspect of the query that defines a format and components of the query, as well as a format for an output created using the query. The data processing system designs the query to facilitate an extraction of data relating to the first type (e.g., the first type of the document).

The data processing system implements various processes to create the query from the portion of the document using the machine learning model. For example, the machine learning model can implement optical character recognition (OCR) technology designed, trained, or implemented to recognize text (Tesseract OCR, Adobe Acrobat, ABBYY FineReader, Microsoft OneNote, Readiris, among others). The machine learning model can implement named entity recognition, natural language processing, image processing, document classification, data parsing, document layout analysis, or pattern recognition techniques, among others. It should be understood that this list is exemplary and is not intended to be construed as exhaustive or limiting.

At ACT 208, the data processing system inputs the query into a second trained machine learning model (e.g., a trained attention embedded transformer network model, such as the trained attention embedded transformer network model 140 of FIG. 1) to generate an output (e.g., extracted data). The second trained machine learning model (e.g., the trained attention embedded transformer network model) recognizes a first pattern in the input and generates the output having a second pattern similar to the first pattern. The output includes at least an extraction of data relating to the first type (e.g., the first type of the document). For example, where the document of the first type is a W-2, the extraction of data relating to the first type generated by the second trained machine learning model (e.g., the trained attention embedded transformer network model) can be a classification of the type of document (e.g., a classification confirming the first type of document), an extraction of an entity relating to the document (e.g., a name of an employee or employer on a W-2), or extracted results of the portion of the document (e.g., a digital recreation of the portion of the document).

At ACT 210, the data processing system templates the output. The data processing system can template the output according to a component of the query, such as, for example a schema of the query. The data processing system ensures that the output is formatted or organized in a certain way. The data processing system can the output according to an ontological library associated with a domain corresponding to the first type of document. An ontological library can contain standardized language and structures for a corresponding domain, or for a specific type of document within the domain.

For an illustrative example, the data processing system determines the document of the first type received from a client device is a W-2 form. The data processing system determines a portion of the document includes the "Employee Information" section of the W-2 form. The data processing system determines a domain associated with the first type (e.g., the W-2 form) is tax. The data processing system determines an ontological library associated with the domain. The data processing system inputs the portion of the document (e.g., the "Employee Information" portion of the W-2) into a trained machine learning model. The trained machine learning model generates a query. The query includes the portion of the document (e.g., the "Employee Information" portion of the W-2), a natural language text component (e.g., instructions for what information a trained attention embedded transformer network model should extract from the "Employee Information" portion of the W-2), or a schema (e.g., instructions for a format or structure of the extracted information of the "Employee Information portion of the W-2), among others. The schema can include instructions to format or structure the output according to the ontological library corresponding to the domain. The data processing system templates the output according to the ontological library associated with the domain. By incorporating the ontological library into the structure of the output, the data processing system standardizes outputs of outputs within a domain.

At ACT 212, the data processing system determines a validation score for the output. The validation score can include various metrics. For example, the validation score can measure an accuracy of the output (e.g., an accuracy of a digital recreation of the portion of the document or an accuracy of a classification of the document of the first type, or an accuracy of a structure of an output). The data processing system determines the validation score for a model (e.g., a machine learning model or an attention embedded transformer network model) according to an accuracy metric (e.g., the ratio of correctly predicted instances by the model to the total instances), a precision metric (e.g., an ability of a model to correctly identify positive instances among the instances the model predicted as positive), a recall metric (e.g., an ability of a model to identify all relevant instances, capturing the ratio of true positive predictions), an F1 Score (e.g., a harmonic mean of precision and recall, providing a balance between false positives and false negatives), an Area Under the Receiver Operating Characteristic (ROC AUC, e.g., an ability of the model to distinguish between classes or types), a mean squared error (e.g., a measurement of the average squared difference between predicted and actual values), Cross Validation (e.g., a measurement of how the model performs when trained on subsets of a data set), Confusion Matrix (e.g., a summary of the counts of true positive, true negative, false positive, and false negative predictions), Log Loss (a measurement of a difference between predicted probabilities and actual outcomes), Mean Absolut Error (MAE, e.g., a measurement of an absolute difference between predicted and actual values), or a combination of the previously mentioned methods, among others.

In some embodiments, the validation score is determined by providing the output of the second trained machine learning model (e.g., the trained attention embedded transformer network model) as a second input to the second trained machine learning model (e.g., the trained attention embedded transformer network model) to generate a second output, and comparing the output with the second output. In some embodiments, the validation score is determined by providing the output (e.g., the extracted data) of the second trained machine learning model (e.g., the trained attention embedded transformer network model) as a second input to the trained machine learning model to generate a second output (e.g., extracted new data), and comparing the output with the second output. In some embodiments, the validation score is determined by providing the output as a second input to the trained machine learning model to generate a second output, by providing the output as a third input to the second trained machine learning model (e.g., the trained attention embedded transformer network model) to generate a third output, and comparing the output, the second output, and the third output and determining that all three outputs are above the threshold.

In some embodiments of the technical solutions described herein, the data processing system determines a validation score for an output of a trained machine learning model (e.g., a query) in a similar manner to those described above.

At decision block 214, the data processing system compares the validation score to a threshold. The threshold can be set by a user of a client device or can be predetermined. The threshold can be determined according to the document of the first type, the portion of the document, a domain associated with the document, a trained machine learning model the data processing system selects to generate the query, or a second trained machine learning model (e.g., a trained attention embedded transformer network model) the data processing system selects to generate the output, among others.

In some embodiments, in response to a determination by the data processing system that the validation score is not above the threshold, the data processing system restarts the method 200 at ACT 202 by identifying a document of a first type received from a client device. The data processing system determines the portion of the document based on a boundary established by a digital overlay. The data processing system generates a new query by inputting the portion of the document determined based on the boundary into the trained machine learning model. The data processing system designs the new query to facilitate an extraction of data relating to the first type. The data processing system inputs the new query into the second trained machine learning model (e.g., trained attention embedded transformer network model) to generate a new output. The data processing system determines a new validation score for the new output. The data processing replaces the output with the new output in response to a determination that the new validation score is above the threshold.

In response to a determination by the data processing system that the validation score is above the threshold, the data processing system displays the output (e.g., the extracted data) (ACT 216). In some embodiments of the technical solutions described herein, the data processing system determines, in response to displaying the output, a second portion of the document, inputs the second portion into the trained machine learning model to generate a second query, inputs the second query into the trained attention embedded transformer network to generate a second output, templates the second output (e.g., the extracted new data), determines a second validation score for the second output, or displays the second output in response to a determination that the second validation score is above a second threshold.

Figure 3:
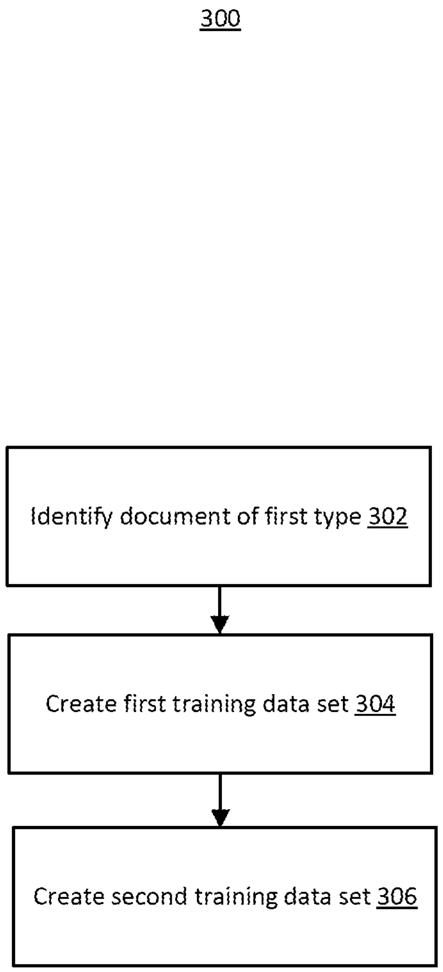
FIG. 3 depicts an example method for generating training data sets.

FIG. 3 depicts an example method 300 for creating training data sets. The method 300 is performed by one or more systems or components depicted in FIG. 1, FIG. 8, or FIG. 9, including, for example, a data processing system. At ACT 302, the method 300 includes a data processing system identifying a document of a first type. The document can be received from a client device. The client device can be or include the client device 125 of FIG. 1. The first type of the document is a classification of the type of document, such as, for example, a W-2, a W-4, an 19, a benefits form, a time entry form, or a performance evaluation form, among others. The data processing system determines the first type from a predetermined list or from input of a client device.

At ACT 304, the data processing system creates a first training data set. The data processing system creates a first new document by performing an action on the document. The action can include a rotation, an inversion, a blurring, a sharpening, a modification of a quantitative aspect of the document, or a modification of a qualitative aspect of the document, among others. The data processing system iteratively performs actions on the document or the first new document to create a plurality of new documents. The first training data set includes the first new document or the plurality of new documents.

At ACT 306, the data processing system creates a second training data set by aggregating the first training data set with the document or the portion of the document.

Figure 4:
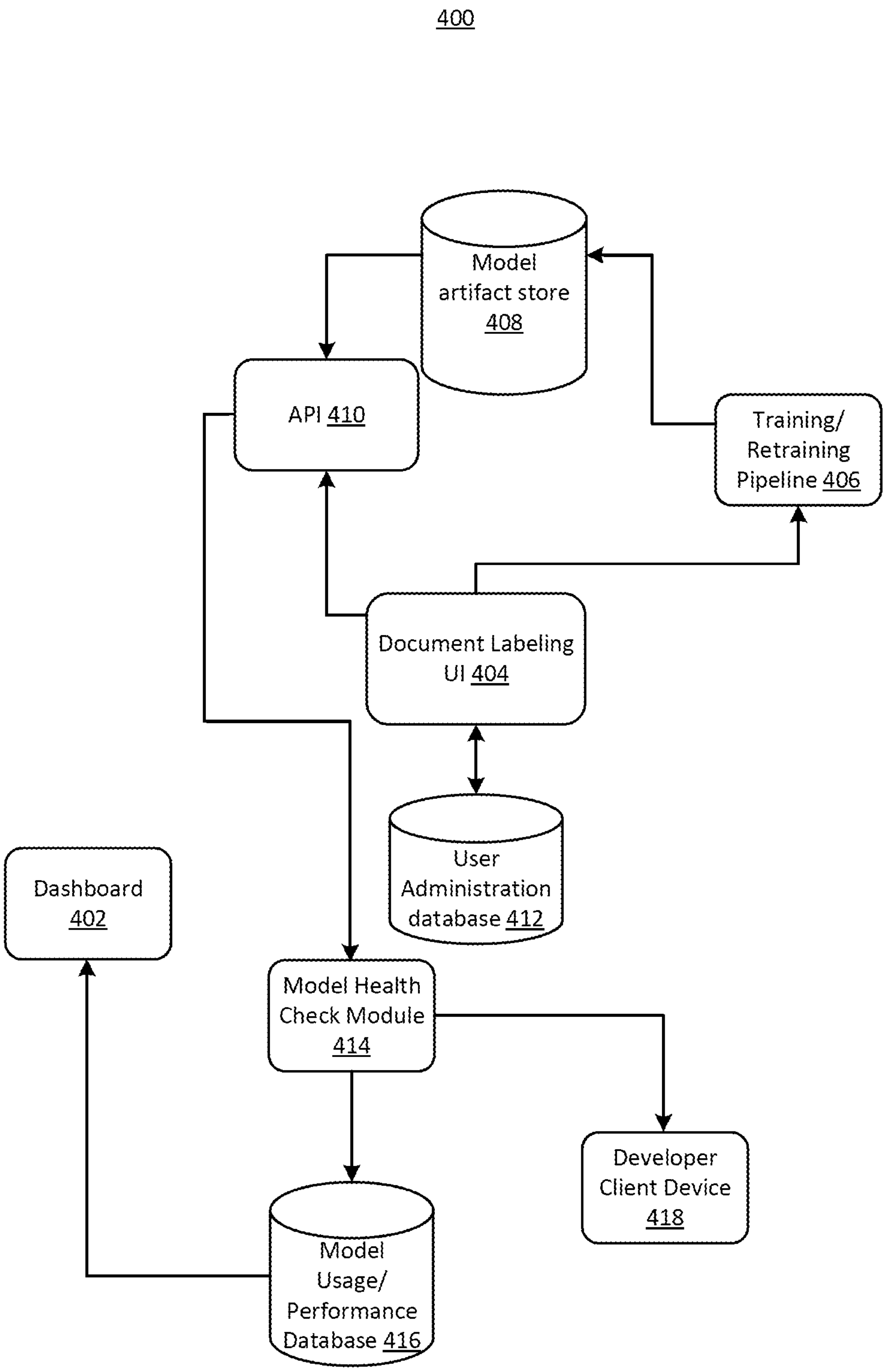
FIG. 4 depicts an example system for templated document data extraction.

FIG. 4 depicts a system 400 that facilitates templating document data extraction according to one or more aspects of the technical solutions described herein. The system 400 includes a dashboard 402, a document labeling user interface (UI) 404, a training/retraining pipeline 406, a model artifact store 408, an application program interface (API) 410, a user administration database 412, a model health check module 414, a model usage/performance database 416, or a developer client device 418. The document labeling UI 404 communicates with the API 410, the user administration database 412, and the training/retraining pipeline 406. The training/retraining pipeline 406 communicates with the document labeling UI 404 and the model artifact store 408. The model artifact store 408 communicates with the training/retraining pipeline 406 and the API 410. The API 410 communicates with the model artifact store 408, the document labeling UI 404, and the model health check module 414. The model health check module 414 communicates with the developer client device 418 and the model usage/performance database 416. The model usage/performance database 416 communicates with the model health check module 414 and the dashboard 402. The dashboard 402 communicates with the model usage/performance database 416. The developer client device 418 communicates with the model health check module 414. The user administration database 412 communicates with the document labeling UI 404.

The document labeling UI 404 can be accessed via a client device, such as the client device 125 of FIG. 1. The user of the client device uploads a document through the document labeling UI 404. The document labeling UI 404 allows the user of the client device to label, annotate, or create borders on the document. The document labeling UI creates a border around a portion of the document determined by the user of the client device by creating a digital overlay around the portion. The document labeling UI 404 preserves the underlying coordinates of the document when creating the digital overlay. The digital overlay can be a bounding box, a polygonal annotation, a mask, a highlighting, or a color coding, among others. The document labeling UI 404 determines a first type of the document or the portion of the document. The document labeling UI 404 determines the type according to a predetermined list or according to an input from a user of a client device.

The user administration database 412 is a database for the document labeling UI 404. The user administration database 412 is a type of memory, data repository, database, or other structure for storing data structures. The user administration database 412 can serve as a log in system for entities associated with the client device. The user administration database 412 stores information relating to the entities or actions that must be executed prior to accessing the document labeling UI, such as, for example, signing a contract.

When a client device accesses the document labeling UI 404, the document labeling UI 404 automatically triggers the training/retraining pipeline 406. The training/retraining pipeline can be or include the model trainer 160 of FIG. 1. The training/retraining pipeline 406 trains, retrains, or validates models (e.g., machine learning models or attention embedded transformer network models). The training/retraining pipeline 406 trains, retrains, or validates models in series or in parallel. The training/retraining pipeline trains, retrains, or validates models on a periodic basis (e.g., every half hour, every hour, every day, every month, every year, among others). The training/retraining pipeline 406 performs tasks such as data preparation, feature engineering, model training, model evaluation, hyperparameter tuning, or model deployment, among others. The training/retraining pipeline 406 can automate training/retraining tasks.

The training/retraining pipeline 406 can perform an action on the document or the portion of the document to create a new document. The training/retraining pipeline can create a plurality of new documents by performing actions on the document or portion of the document. The training/retraining pipeline 406 aggregates the plurality of new documents with the document or the portion of the document to create a training data set. In this manner, the technical solutions described herein address the technical challenge of large amounts of data being required to accurately train models, by creating training data from documents received from the document labeling UI 404.

The training/retraining pipeline 406 stores trained models (e.g., trained machine learning models or trained attention embedded transformer network models) in or retrieves trained models from the model artifact store 408. The model artifact store 408 can be or include the model artifact store 130 of FIG. 1. The model artifact store 408 includes a storage or data repository to store the models/trained models/retrained models. In some aspects of the technical solutions described herein, the model artifact store 408 is maintained, owned, or operated by the same entity as the entity maintaining, owning, or operating the system 400. In some embodiments of the technical solutions described herein, the model artifact store 408 is maintained, owned, or operated by an outside entity such as a government, individual, company, or non-profit organization.

The document labeling UI 404 sends the labeled document or the labeled portion of the document to the API 410. The API 410 can be or include the data extractor 150 of FIG. 1. The API 410 selects, based on the portion of the document, one or more trained models (e.g., trained machine learning models or trained attention embedded transformer network models) to extract data from the portion of the document. The API 410 facilitates query engineering by pre-processing the portion of the document using a trained machine learning model to generate a query, and providing the query to a second trained machine learning model (e.g., a trained attention embedded transformer network model) to facilitate an extraction of data from the portion of the document. The query (e.g., the output of the trained machine learning model) includes the portion of the document, the document, a natural language text query, key-value pairs, or a schema, among others.

The API 410 templates the data extraction into a specified format. The API 410 templates the data extraction according to an ontological library. The API 410 determines a domain corresponding to the first type of the document. The API 410 selects an ontological library according to the domain. The ontological library includes a list of standardized terms, formats, or schemas for outputs of data extraction (e.g., extracted data). By formatting the output of the data extraction according to an ontological library, the technical solutions described herein facilitate standardized data extraction across a variety of domains. The API 410 sends data about the models it uses to perform data extraction to the model health check module 414.

The model health check module 414 analyzes and records the health, utilization, performance, or accuracy, among others, of the trained models (e.g., trained machine learning models or trained attention embedded transformer network models). The model health check module 414 notifies the developer client device 418 when the performance of a model falls below a threshold. Upon receiving this notification, a user of the developer client device 418 intervenes to further analyze the health of the model. The model health check module 414 stores data of the health, utilization, performance, or accuracy, among others in the model usage/performance database 416.

The usage/performance database 416 is a type of memory, data repository, database, or other structure for storing data structures. The usage/performance database 416 receives data of the accuracy, utilization, health, or validity, among others, of models used by the API 410 to extract data. The usage/performance database 416 sends this data to the dashboard 402.

The dashboard 402 receives data from the usage/performance database 416. The dashboard 402 displays this data in the form of graphs or tables, among others. The dashboard 402 can be a part of the document labeling UI 404, or the dashboard 402 can be separate. The dashboard can be hosted on a client device.

Figure 5:
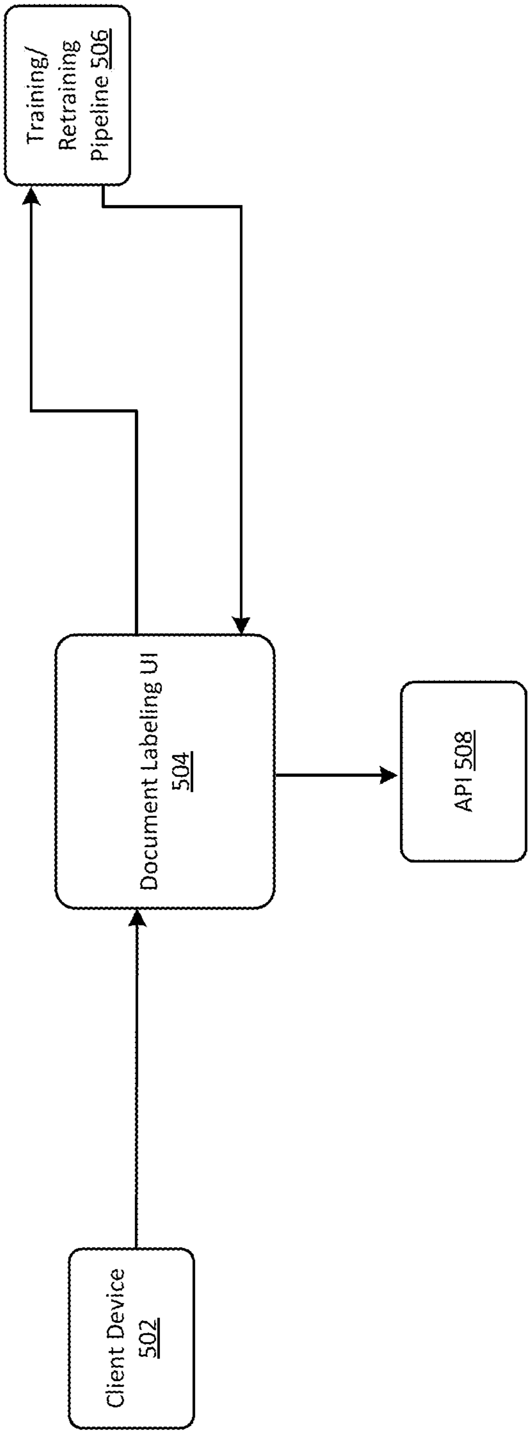
FIG. 5 depicts an example hybrid system-method for templated document data extraction.

FIG. 5 depicts a hybrid system-method 500 for templating document data extraction. The hybrid system-method 500 includes a client device 502, a document labeling UI 504, a training/retraining pipeline 506, or an API 508.

The client device 502 can be or include the client device 125 of FIG. 1. The client device 502 is or includes any computing device such as a laptop, a desktop computer, a smart phone, a tablet, etc. A user may operate, display, or otherwise execute the document labeling UI 504, training/retraining pipeline 506, or API 508. The client device 502 can be coupled with storage or memory. In some aspects of the technical solutions described herein, the client device 502 is operated by a user associated with an organization to perform various tasks associated with the organization. In some aspects of the technical solutions described herein, a user of the client device must perform an action to allow the client device 502 to execute the document labeling UI 504. The action can be executing a contract, creating a user profile, or agreeing to terms of service, among others.

The document labeling UI 504 can be part of the application 145 of FIG. 1. The document labeling UI 504 enables the client device 502 to select and upload documents for data extraction. A user of the client device 502 selects a type of document they wish to label/extract data from a predetermined list, or inputs the type of document. The document labeling UI 504 creates a label on the document according to input from the client device 502. The document labeling UI 504 creates a digital overlay over a portion of the document. In some embodiments of the technical solutions described herein, after the user of the client device 502 performs the action, the portion of the document is sent to the API 508. In some embodiments of the technical solutions described herein, the portion of the document is sent to the training/retraining pipeline 506.

The training/retraining pipeline 506 can be or include the model trainer 160 of FIG. 1. The training/retraining pipeline trains and retrains models (e.g., machine learning models or attention embedded transformer network models) to extract data from portions of documents. In some embodiments of the technical solutions described herein, the training/retraining pipeline 506 sends a feedback model to the document labeling UI 504 for validation. The feedback model allows a user of a client device 502 to validate results of the data extraction. In this manner, the technical solutions described herein provide for robust training of machine learning models or attention embedded transformer network models.

In some aspects of the technical solutions described herein, the training/retraining pipeline 506 manipulates the portion of the document to create a plurality of new documents. The manipulation can be a rotation, an inversion, a blurring, or a sharpening, among others. The training/retraining pipeline 506 aggregates the plurality of new documents with the portion of the document to create a training data set. In this manner, the technical solutions described herein can create large training data sets from smaller samples of data.

The API 508 can be or include the data extractor 150 of FIG. 1. The API 508 receives the portion (e.g., the labeled of the document) and extracts data from the portion. The API 508 implements one or more trained models (e.g., trained machine learning models or trained attention embedded transformer network models) to extract data from the portion. The API 508 templates the data extraction into a standardized format. The API 508 determines a domain associated with the first type of the document. The API 508 selects an ontological library corresponding to the domain. The ontological library can be the ontological library 175 of FIG. 1. The ontological library contains standardized terms and formats corresponding to the domain. The API structures the extracted data using the standardized terms and formats of the ontological library.

Figure 6:
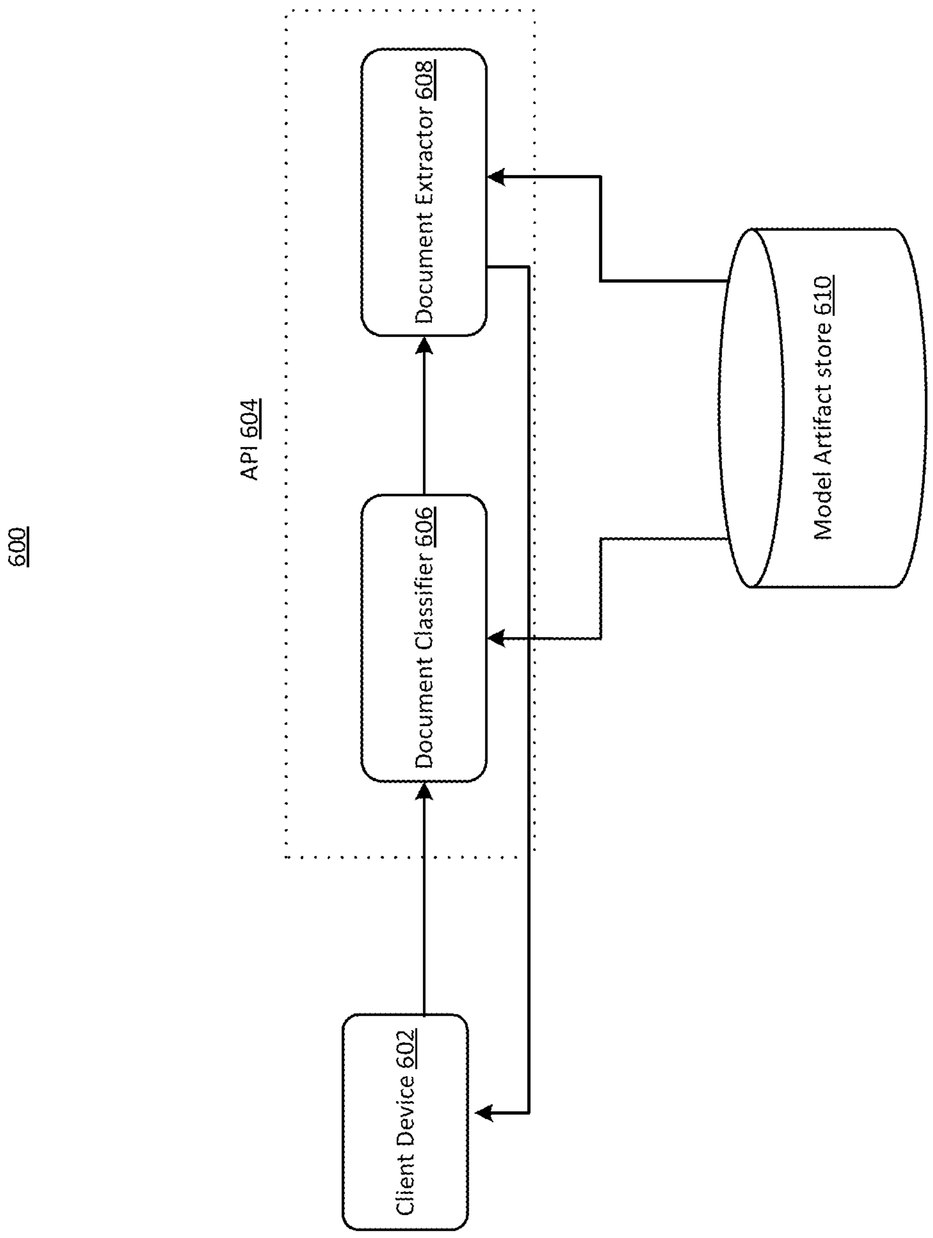
FIG. 6 depicts an example method for extracting data.

FIG. 6 depicts a system 600 for extracting data. The system 600 includes a client device 602, an API 604, and a model artifact store 610. The client device 602 can be or include the client device 125 of FIG. 1. The client device 602 is or includes any computing device such as a laptop, a desktop computer, a smart phone, a tablet, etc. A user may operate, display, or otherwise execute the API 604. The client device 602 can be coupled with storage or memory. In some aspects of the technical solutions described herein, the client device 602 is operated by a user associated with an organization to perform various tasks associated with the organization. In some aspects of the technical solutions described herein, a user of the client device must perform an action to allow the client device 602 to execute the document labeling UI 504. The action can be executing a contract, creating a user profile, or agreeing to terms of service, among others. The client device 602 can receive a document. The client device 602 can create a portion of the document by creating a digital overlay over a portion of the document. The client device 602 inputs the portion of the document into the API.

The model artifact store 610 can be or include the model artifact store 130 of FIG. 1. The model artifact store 130 contains trained models that have been trained to classify documents received from the client device 602 and to extract data from the document. The information in the model artifact store 610 is stored in any kind of memory, such as a cloud or hard drive. The model artifact store includes, for example, random access memory (RAM), dynamic random access memory (DRAM), static random access memory (SRAM), error correcting code (ECC), read only memory (ROM), programmable read only memory (PROM), or electrically erasable read only memory (EEPROM). The information, data structures, or models contained within the model artifact store is dynamic and changes periodically (e.g., daily or every millisecond), or via input from a user operating a client device 602.

The API 604 can be a part of the data extractor 150 of FIG. 1. The API 604 includes the document classifier 606 or the document extractor 608, among others. The API 604 includes endpoints (specific URLs or URIs that represent the locations where API requests can be made, where each endpoint can correspond to a specific function or resource), methods (e.g., HTTP methods such as GET, POST, PUT, DELETE) that can be used to perform actions on specified resources), request and response formats (e.g., XML or JSON formats), or authenticators, among others. The API 604 can be an Open API, an Internal API, a RESTful API, a SOAP API, a JSCON-RPC and XML-RPC API, a Graph QL API, a Webhook, a Library-based API, a Hardware API, a Database API, a Third-Party API, an OpenID Connect API or OAuth API, among others.

The document classifier 606 classifies the document or the portion of the document received from the client device 602. The document classifier interfaces with the model artifact store 610 to determine a model (e.g., a machine learning model or an attention embedded transformer network model) to use to determine a classification of the document. The document classifier 606 can classify a first type of the document (e.g., a W-2, a W-4, or an I9, among others), a second type of the portion of the document relating to the first type of the document, (e.g., "Employee Information Section," "Employer Information Section," "Employment History Section," "Benefits Section," "Earnings Section," "Withholdings Section," "Gross Income," among others), a domain corresponding to the first type of the document (e.g., tax, HR, benefits, payroll, time management, performance management, among others). The document classifier 606 sends the classification to the document extractor 608. In some embodiments of the technical solutions described herein, the document classifier sends a query to the document extractor 608. The query can include a natural language text component, key value pairs, or schema specifying a format of the data extraction, among others.

The document extractor 608 extracts data from the document according to the classification received from the document classifier 606. The document extractor 608 interfaces with the model artifact store 610 to determine a model (e.g., a machine learning model or an attention embedded transformer network model) to use to extract data from the document or the portion of the document. In some embodiments of the technical solutions described herein, the document extractor 608 determines an ontological library corresponding to the classification received from the document classifier. The ontological library can be or include the ontological library 175 of FIG. 1. In some embodiments of the technical solutions described herein, the document extractor 608 templates the data extraction according to the ontological library. In some embodiments of the technical solutions described herein, the data extraction is a classification of the document or the portion of the document, an entity corresponding to the document or the portion of the document, or data contained in the document or the portion of the document.

Figure 7:
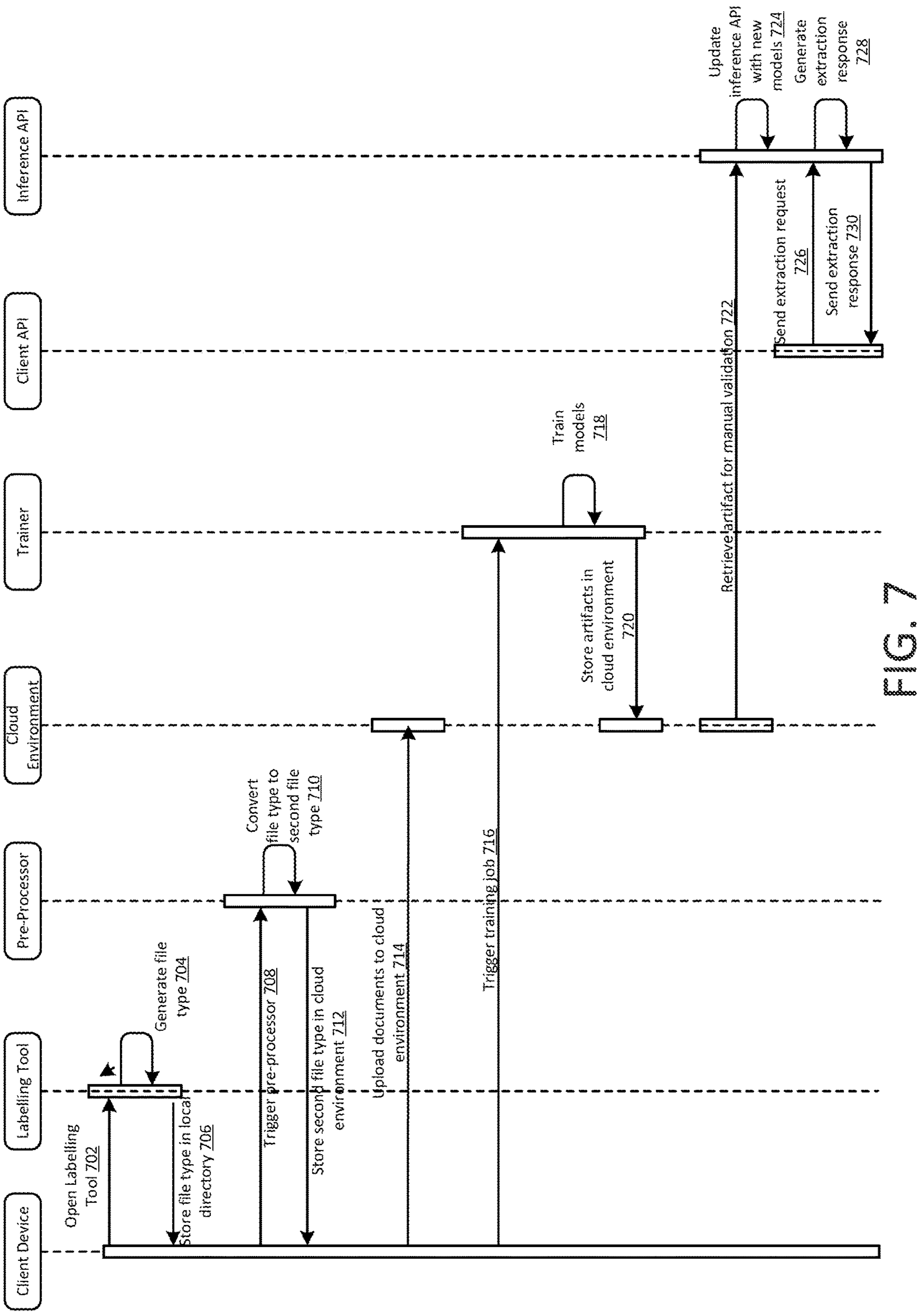
FIG. 7 depicts an example hybrid method-system for templating document data extraction.

FIG. 7 depicts a hybrid method-system 700 for templating document data extraction according to one or more aspects of the technical solutions described herein. The hybrid method-system 700 can be performed by one or more systems or components depicted in FIG. 1, FIG. 8, or FIG. 9. The hybrid method-system 700 includes a client device, a labeling tool, a pre-processor, a cloud environment, a trainer, a client application program interface (API), or an inference API, among others (e.g., components of the hybrid method-system 700). The hybrid method-system 700 can be described as a series of interactions between pairs of components of the hybrid method-system 700.

The hybrid method-system 700 includes a series of interactions between the client device and the labeling tool. ACT 702, ACT 704, and ACT 706 are steps executed by the hybrid method-system 700 to label images or portions of images in preparation for data extraction. At ACT 702, a user of the client device accesses (e.g., opens) the labeling tool. The labeling tool can be hosted on an application, such as the application 145 of FIG. 1, on the client device. The application can be hosted remotely and accessed by the client device through a network, such as the network 101 of FIG. 1. The labeling tool can include an image directory containing various images. The client device can upload an image to the image directory. A user of the client device selects or uploads and image. The user of the client device selects a type corresponding to the image (e.g., a W-2 or a W-4, among others). The type can be selected from a predetermined list, or input by the user of the client device. The user of the client device labels the image. In some aspects of the technical solutions described herein, the user of the client device labels a portion of the image. The labeling tool creates the label by placing a digital overlay over the image. The digital overlay can be a border, a mask, a series of lines, a color change, or highlighting, among others. At ACT 704, the labeling tool generates a file type corresponding to the labeled image, such as, for example a PASCAL VOC XML file. At ACT 706, the labeling tool stores the file type in a local directory of the client device.

ACT 708, ACT 710, ACT 712, and ACT 714 are steps executed by the hybrid method-system model 700 to pre-process data in preparation for training models (e.g., machine learning models or attention embedded transformer network models). Responsive to ACT 706, the client device triggers a pre-processing script in the pre-processor (ACT 708). The pre-processor can be a part of the data extractor 150 in FIG. 1. At ACT 710, the pre-processor converts the file type to a second file type. For example, in some embodiments of the technical solutions described herein, the pre-processor converts the PASCAL VOC XML file to a COCO JSON file. At ACT 712, the pre-processor stores the second file type in the cloud environment. The cloud environment can be or include the cloud resources 905 of FIG. 9. Examples of clout environments include Amazon Web Service (AWS, S3), Microsoft Azure, Google Cloud Platform (GCP), or IBM Cloud, among others. The pre-processor can store the second file type on the client device. In addition to converting the file type to a second file type, the pre-processor can interface with or communicate with the labeling tool or the client device to receive and augment the image, or the labeled portion of the image. The pre-processor employs at least one of a plurality of augmentation actions, including rotating, inverting, blurring, or sharpening, among others, the image or the label of the image. At ACT 714, the client device uploads documents to the cloud environment. The documents can include the image, or the portion of the image, or training data sets, among others.

ACT 716, ACT 718, ACT 720, ACT 722, and ACT 724 are steps executed by the hybrid method-system 700 that facilitate manual validation of a newly trained model. The trainer can be or include the model trainer 160 of FIG. 1. Responsive to ACT 716, the client device triggers a training job by the trainer. At ACT 718, the trainer trains machine learning models or attention embedded transformer network models, among others. The machine learning models can be or include the machine learning models 135 of FIG. 1. The attention embedded transformer network models can be or include the attention embedded transformer network models 140 of FIG. 1. The trainer trains the models (e.g., machine learning models or attention embedded transformer network models) using a variety of techniques or platforms. For example, the trainer trains the models using Optical Character Recognition (OCR) techniques, including Detectron 2, MMDetection, YOLO, TensorFlow Object Detection API, OpenCV, EfficientDet, MXNet GluonCV, Hugging Face Transformers, or Detecto, among others. The trainer trains machine learning models to interface with attention embedded transformer network models. At ACT 720, the trainer stores trained models as artifacts in the cloud environment. At ACT 722, the inference API retrieves an artifact from the cloud environment for manual validation. The inference API is an interface used by a developer (e.g., a user of a client device) to make predictions or inferences using a machine learning model. The inference API uses a trained model to make predictions on new data. The inference API enables a user of a client device to validate a model (e.g., a machine learning model or an attention embedded transformer network model). At ACT 724, a user of a client device updates the inference API with new models.

ACT 726, ACT 728, and ACT 730 are steps the hybrid method-system executes to extract data using trained and validated models (e.g., machine learning models or attention embedded transformer network models). At ACT 726, a user of a client device sends an extraction request through the client API. The client API sends the extraction request to the inference API. The client API can be part of the application 145 of FIG. 1. The client API can include a labeling tool. When a user of a client device sends an extraction request, the client API places a border around information the user of the client device wishes to extract by placing a digital overlay. At ACT 728, the inference API generates the extraction response. The inference API analyzes the extraction request and selects one or more trained models to generate the extraction response. The inference API can validate the extraction response. At ACT 730, the interface API sends the extraction response to the client API.

FIG. 8 is an illustrative architecture of a computing system 800 that implements one or more aspects described herein. The computing system 800 is only one example of a suitable computing system and is not intended to suggest any limitation as to the scope of use or functionality of the technical solutions described herein. Also, computing system 800 should not be interpreted as having any dependency or requirement relating to any one or combination of components illustrated in computing system 800.

As shown in FIG. 8, computing system 800 includes a computing device 805. The computing device 805 can be resident on a network infrastructure such as within a cloud environment as shown in FIG. 9 or can be a separate independent computing device (e.g., a computing device of a third-party service provider). The computing device 805 includes a bus 810, a processor 815, a storage device 820, a system memory (hardware device) 825, one or more input devices 830, one or more output devices 835, and a communication interface 840.

The bus 810 permits communication among the components of computing device 805. For example, bus 810 can be any of several types of bus structures including a memory bus or memory controller, a peripheral bus, and a local bus using any of a variety of bus architectures to provide one or more wired or wireless communication links or paths for transferring data or power to, from, or between various other components of computing device 805.

The processor 815 is one or more processors or processors that include any processing circuitry operative to interpret and execute computer readable program instructions, such as program instructions for controlling the operation and performance of one or more of the various other components of computing device 805. In aspects of the technical solutions described herein, processor 815 interprets and executes the processes, steps, functions, or operations of the technical solutions described herein, which can be operatively implemented by the computer readable program instructions.

For example, processor 815 provides an enterprise-wide security approach with all stakeholders (e.g., Dev teams, leadership, CSO office, etc.) with a set of various security scanner types and information sources integrated into a single tool. In aspects of the technical solutions described herein, the processor 815 uniformly integrates or packages existing scanner types into a single tool that standardizes and visually displays the output over different development teams for different scanner types. The scanner types which are packaged into the integrated security tool can capture specific requirements of the different teams, i.e., ensures that the tools support varied team development methodologies and different tech stacks to capture required security vulnerabilities. The processor 815 also establishes a regular feedback mechanism and can be used to develop a process for remediation timelines and priority including at risk vulnerabilities. In aspects of the technical solutions described herein, processor 815 receives input signals from one or more input devices 830 or drive output signals through one or more output devices 835. The input devices 830 are, for example, a keyboard, touch sensitive user interface (UI), etc. The output devices 835 are, for example, any display device, printer, etc.

The storage device 820 includes removable/non-removable, volatile/non-volatile computer readable media, such as, but not limited to, non-transitory media such as magnetic or optical recording media and their corresponding drives. The drives and their associated computer readable media provide for storage of computer readable program instructions, data structures, program modules and other data for operation of computing device 805 in accordance with the different aspects of the technical solutions described herein. In aspects of the technical solutions described herein, storage device 820 stores operating system 845, application programs 850, and program data 855 in accordance with aspects of the technical solutions described herein.

The system memory 825 includes one or more storage mediums, including for example, non-transitory media such as flash memory, permanent memory such as read-only memory ("ROM"), semi-permanent memory such as random-access memory ("RAM"), any other suitable type of storage component, or any combination thereof. In some aspects of the technical solutions described herein, an input/output system 860 (BIOS) including the basic routines that help to transfer information between the various other components of computing device 805, such as during start-up, can be stored in the ROM. Additionally, data or program modules 865, such as at least a portion of operating system 845, application programs 850, or program data 855, that are accessible to or presently being operated on by processor 815 can be contained in the RAM.

The communication interface 840 includes any transceiver-like mechanism (e.g., a network interface, a network adapter, a modem, or combinations thereof) that enables computing device 805 to communicate with remote devices or systems, such as a mobile device or other computing devices such as, for example, a server in a networked environment, e.g., cloud environment. For example, computing device 805 is connected to remote devices or systems via one or more local area networks (LAN) or one or more wide area networks (WAN) using communication interface 840.

As discussed herein, computing system 800 are configured to integrate different scanner types into a single workbench or tool. This allows developers and other team members a uniform approach to assessing security vulnerabilities in a code throughout the enterprise. In particular, computing device 805 performs tasks (e.g., process, steps, methods or functionality) in response to processor 815 executing program instructions contained in a computer readable medium, such as system memory 825. The program instructions are read into system memory 825 from another computer readable medium, such as data storage device 820, or from another device via the communication interface 840 or server within or outside of a cloud environment. In aspects of the technical solutions described herein, an operator can interact with computing device 805 via the one or more input devices 830 or the one or more output devices 835 to facilitate performance of the tasks or realize the end results of such tasks in accordance with aspects of the technical solutions described herein. In additional or alternative aspects, hardwired circuitry is used in place of or in combination with the program instructions to implement the tasks, e.g., steps, methods or functionality, consistent with the different aspects of the technical solutions described herein. Thus, the steps, methods or functionality described herein is implemented in any combination of hardware circuitry and software.

FIG. 9 shows an exemplary cloud computing environment 900 in accordance with aspects of the technical solutions described herein. In aspects of the technical solutions described herein, one or more aspects, functions or processes described herein is performed or provided via cloud computing environment 900. As depicted in FIG. 9, cloud computing environment 900 includes cloud resources 905 that are made available to client devices 910 via a network 915, such as the Internet. Cloud resources 905 can be on a single network or a distributed network. Cloud resources 905 can be distributed across multiple cloud computing systems or individual network enabled computing devices. Cloud resources 905 include a variety of hardware or software computing resources, such as servers, databases, storage, networks, applications, and platforms that perform the functions provided herein including storing code, running scanner types and provided an integration of plural scanner types into a uniform and standardized application, e.g., display.

Client devices 910 comprise any suitable type of network-enabled computing device, such as servers, desktop computers, laptop computers, handheld computers (e.g., smartphones, tablet computers), set top boxes, and network-enabled hard drives. Cloud resources 905 are typically provided and maintained by a service provider so that a client does not need to maintain resources on a local client device 910. In aspects of the technical solutions described herein, cloud resources 905 include one or more computing system 800 of FIG. 8 that is specifically adapted to perform one or more of the functions or processes described herein.

Cloud computing environment 900 is configured such that cloud resources 905 provide computing resources to client devices 910 through a variety of service models, such as Software as a Service (SaaS), Platforms as a service (PaaS), Infrastructure as a Service (IaaS), or any other cloud service models. Cloud resources 905 are configured, in some cases, to provide multiple service models to a client device 910. For example, cloud resources 905 provide both SaaS and IaaS to a client device 910. Cloud resources 905 are configured, in some cases, to provide different service models to different client devices 910. For example, cloud resources 905 provide SaaS to a first client device 910 and PaaS to a second client device 910.

Cloud computing environment 900 is configured such that cloud resources 905 provide computing resources to client devices 910 through a variety of deployment models, such as public, private, community, hybrid, or any other cloud deployment model. Cloud resources 905 are configured, in some cases, to support multiple deployment models. For example, cloud resources 905 provide one set of computing resources through a public deployment model and another set of computing resources through a private deployment model.

In aspects of the technical solutions described herein, software or hardware that performs one or more of the aspects, functions or processes described herein can be accessed or utilized by a client (e.g., an enterprise or an end user) as one or more of a SaaS, PaaS and IaaS model in one or more of a private, community, public, and hybrid cloud. Moreover, although aspects of the technical solutions described herein include a description of cloud computing, the systems and methods described herein are not limited to cloud computing and instead can be implemented on any suitable computing environment.

Cloud resources 905 are configured to provide a variety of functionality that involves user interaction. Accordingly, a user interface (UI) is provided for communicating with cloud resources 905 or performing tasks associated with cloud resources 905. The UI is accessed via a client device 910 in communication with cloud resources 905. The UI is configured to operate in a variety of client modes, including a fat client mode, a thin client mode, or a hybrid client mode, depending on the storage and processing capabilities of cloud resources 905 or client device 910. Therefore, a UI is be implemented as a standalone application operating at the client device in some aspects of the technical solutions described herein. In other aspects, a web browser-based portal is used to provide the UI. Any other configuration to access cloud resources 905 can also be used in various implementations.

The foregoing examples have been provided merely for the purpose of explanation and are in no way to be construed as limiting of the technical solutions described herein. While aspects of the technical solutions described herein have been described with reference to an exemplary embodiment, it is understood that the words which have been used herein are words of description and illustration, rather than words of limitation. Changes can be made, within the purview of the appended claims, as presently stated and as amended, without departing from the scope and spirit of the technical solutions described herein in their aspects. Although aspects of the technical solutions have been described herein with reference to particular means, materials and embodiments, the technical solutions described herein are not intended to be limited to the particulars described herein; rather, the technical solutions described herein extend to all functionally equivalent structures, methods and uses, such as are within the scope of the appended claims.

Although an example computing system has been described in FIG. 9, the subject matter including the operations described in this specification can be implemented in other types of digital electronic circuitry, or in computer software, firmware, or hardware, including the structures described in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiations in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

The subject matter and the operations described in this specification can be implemented in digital electronic circuitry, or in computer software, firmware, or hardware, including the structures described in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently described systems or methods, their components, acts, or elements to single or plural configurations. References to any act or element being based on any information, act or element may include implementations where the act or element is based at least in part on any information, act, or element.

Any implementation described herein may be combined with any other implementation or embodiment, and references to "an implementation," "some implementations,"

"one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations described herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as substitutions, changes and omissions can be made in the design, operating conditions and arrangement of the described elements and operations without departing from the scope of the technical solutions described herein.

References to "approximately," "substantially", or other terms of degree include variations of +/−10% from the given measurement, unit, or range unless explicitly indicated otherwise. Coupled elements can be electrically, mechanically, or physically coupled with one another directly or with intervening elements. Scope of the Systems and methods described herein is thus indicated by the appended claims, rather than the foregoing description, and changes that come within the meaning and range of equivalency of the claims are embraced therein.

What is claimed is:

1. A system, comprising:

one or more processors, coupled with memory, to:

identify a document of a first type received from a client device;

establish, based on a digital overlay, a boundary comprising a portion that is within the document;

select the portion that is within the document based on the boundary;

generate, using a trained machine learning model, a query using the portion that is within the document, wherein the query is generated to facilitate an extraction of data, wherein the data to be extracted is based on the document being of the first type; and extract the data from the document of the first type by inputting the query to a second trained machine learning model.

2. The system of claim 1, wherein the one or more processors are further configured to:

determine a validation score for the extracted data; and display the extracted data via the client device in response to the validation score being above a threshold.

3. The system of claim 2, wherein the one or more processors are further configured to:

determine the validation score using the trained machine learning model, wherein the trained machine learning model receives the extracted data as an input.

4. The system of claim 2, wherein the one or more processors are further configured to:

determine, using the second trained machine learning model, the validation score, wherein the second trained machine learning model receives the extracted data as an input.

5. The system of claim 1, wherein the one or more processors are further configured to:

determine, via the trained machine learning model, a first validation score, wherein the trained machine learning model receives the extracted data as a first input;

determine, via the second trained machine learning model, a second validation score, wherein the second machine learning model receives the extracted data as a second input; and display the extracted data in response to a determination that the first validation score and the second validation score are both above a threshold.

6. The system of claim 1, wherein the one or more processors are further configured to:

determine a validation score for the extracted data;

extract new data from the document of the first type by inputting the query into the second trained machine learning model in response to a determination that the validation score is below a threshold;

determine a new validation score for the extracted new data; and replace the extracted data with the extracted new data, in response to a determination that the new validation score is above the threshold.

7. The system of claim 1, wherein the one or more processors are further configured to:

determine a domain of a plurality of domains of the document according to the first type; and template the extracted data according to an ontological library corresponding to the domain determined.

8. The system of claim 1, wherein the one or more processors are further configured to:

create at least one new document by an action performed on the document; and input a first training data set to train the trained machine learning model, wherein the first training data set comprises the at least one new document and the document.

9. The system of claim 8, the action performed on the document is at least one of:

a rotation;

an inversion;

a rescaling;

a blurring;

a sharpening;

a modification of a quantitative aspect; and a modification of a qualitative aspect.

10. The system of claim 1, wherein the one or more processors are further configured to:

create at least one new document, wherein the new document is a rotation of the document; and input a first training data set to a machine learning model to train the machine learning model, wherein the first training data set comprises the at least one new document and the document.

11. The system of claim 1, wherein the one or more processors are configured to:

determine a domain of a plurality of domains corresponding to the first type of the document, the plurality of domains comprising;

payroll;

tax;

benefits;

human resources;

time management; or performance management.

12. The system of claim 1, wherein the one or more processors are further configured to:

receive, via the client device, an indication of the first type of document.

13. The system of claim 1, wherein the second trained machine learning model is a trained attention embedded transformer network model.

14. A method, comprising:

identifying, by one or more processors, a document of a first type received from a client device;

establishing, by the one or more processors, based on a digital overlay, a boundary comprising a portion that is within the document;

selecting, by the one or more processors, the portion that is within the document based on the boundary;

generating, by the one or more processors, using a trained machine learning model, a query using the portion that is within the document, wherein the query is generated to facilitate an extraction of data, wherein the data to be extracted is based on the document being of the first type; and extracting, by the one or more processors, the data from the document of the first type by inputting the query into a second trained machine learning model.

15. The method of claim 14, comprising:

determining, by the one or more processors, a validation score for the extracted data; and displaying, by the one or more processors, the extracted data in response to determining that the validation score is above a threshold.

16. The method of claim 14, comprising:

determining, by the one or more processors, a validation score for the extracted data;

extracting, by the one or more processors, new data from the document of the first type by inputting the query into the second machine learning model, in response to determining that the validation score is below a threshold;

determining, by the one or more processors, a new validation score for the extracted new data; and replacing, by the one or more processors, the extracted data with the extracted new data, in response to determining that the new validation score is above the threshold.

17. The method of claim 14, comprising:

creating, by the one or more processors, at least one new document through an action performed on the document; and inputting, by the one or more processors, a first training data set to a machine learning model to train the machine learning model, wherein the first training data set comprises the at least one new document and the document.

18. The method of claim 14, comprising:

receiving, by the one or more processors, an indication of the first type of the document from the client device.

19. A non-transitory computer-readable medium comprising instructions embodied thereon, the instructions to cause a processor to:

identify a document of a first type received from a client device;

establish, based on a digital overlay, a boundary comprising a portion that is within the document;

select the portion that is within the document based on the boundary;

generate, using a trained machine learning model, a query using the portion that is within the document, wherein the query is generated to facilitate an extraction of data relating to the first type; and extract the data from the document of the first type by inputting the query into a second trained machine learning model.

20. The non-transitory computer-readable medium of claim 19, comprising the instructions embodied thereon to cause the processor to:

determine a validation score for the extracted data; and display the extracted data in response to a determination that the validation score is above a threshold.

* * * * *